(12) United States Patent
Ueki et al.

(10) Patent No.: US 10,578,914 B2
(45) Date of Patent: Mar. 3, 2020

(54) LIQUID CRYSTAL PANEL AND LIQUID CRYSTAL DISPLAY DEVICE

(71) Applicant: FUJIFILM Corporation, Tokyo (JP)

(72) Inventors: Keigo Ueki, Kanagawa (JP); Katsuyuki Takada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 58 days.

(21) Appl. No.: 15/875,261

(22) Filed: Jan. 19, 2018

(65) Prior Publication Data

US 2018/0157111 A1 Jun. 7, 2018

Related U.S. Application Data

(63) Continuation of application No. PCT/JP2016/071225, filed on Jul. 20, 2016.

(30) Foreign Application Priority Data

Jul. 21, 2015 (JP) .................................. 2015-144446

(51) Int. Cl.
  *G02F 1/1335* (2006.01)
  *G02B 5/30* (2006.01)
  (Continued)

(52) U.S. Cl.
  CPC ..... *G02F 1/133528* (2013.01); *G02B 5/3033* (2013.01); *G02F 1/13338* (2013.01);
  (Continued)

(58) Field of Classification Search
  CPC .......... G02F 1/13338; G02F 1/133528; G02F 1/133602; G02F 1/133305; G02F 2202/28;
  (Continued)

(56) References Cited

U.S. PATENT DOCUMENTS 6,633,279 B1 * 10/2003 Kono .................. G02F 1/13338
  345/173
2014/0146246 A1 * 5/2014 Ma ........................ G06F 3/0412
  349/12

(Continued)

FOREIGN PATENT DOCUMENTS

JP  2001-142638 A  5/2001
JP  2011-013500 A  1/2011

(Continued)

OTHER PUBLICATIONS

Office Action issued by the Korean Intellectual Property Office dated Oct. 31, 2018 in connection with Korean Application No. 10-2018-7001803.

(Continued)

*Primary Examiner* — Hoan C Nguyen
(74) *Attorney, Agent, or Firm* — Edwards Neils LLC; Jean C. Edwards, Esq

(57) ABSTRACT

The liquid crystal panel has a front-surface plate, a front-side polarizing plate, a liquid crystal display element, and a rear-side polarizing plate in an integrally laminated state, in which the front-surface plate and the front-side polarizing plate are in the state of being laminated with each other via an adhesive layer having a thickness of 2 μm or more, and the liquid crystal panel satisfies Formula A-1: $2020 \, \mu m \text{GPa} > E_{Cp} \times d_{Cp} \times \varepsilon_{Cp} \times (100-P)/100 + (E_f \times d_f \times \varepsilon_f) - (E_r \times d_r \times \varepsilon_r) > 0 \, \mu m \text{GPa}$ ($E_{Cp}$ is the modulus of elasticity, $d_{Cp}$ is the thickness, and $\varepsilon_{Cp}$ is the humidity dimensional change rate, of the front-surface plate, $E_f$ is the modulus of elasticity, $d_f$ is the thickness, and $\varepsilon_f$ is the humidity dimensional change rate, of the front-side polarizing plate, $E_r$ is the modulus of elasticity, $d_r$ is the thickness, and $\varepsilon_r$ is the humidity dimensional change rate, of the rear-side polarizing plate, P is the stress relaxation rate of the adhesive layer).

13 Claims, 1 Drawing Sheet

* may include cellulose acylate film
- an antistatic agent may be included in any one of the plates, layers, or films

(51) Int. Cl.
*G02F 1/1333* (2006.01)
*G06F 3/041* (2006.01)

(52) U.S. Cl.
CPC .. *G02F 1/133305* (2013.01); *G02F 1/133602* (2013.01); *G06F 3/0412* (2013.01); *G02F 2001/133331* (2013.01); *G02F 2001/133562* (2013.01); *G02F 2202/28* (2013.01)

(58) Field of Classification Search
CPC ........ G02F 2001/133331; G02F 2001/133562; G06F 3/0412; G02B 5/3033
See application file for complete search history.

(56) References Cited

U.S. PATENT DOCUMENTS

| | | | | |
|---|---|---|---|---|
| 2014/0254014 | A1* | 9/2014 | Ishiguro | ............... G02B 5/3083 359/489.07 |
| 2015/0131038 | A1* | 5/2015 | Ishiguro | ............ G02F 1/133528 349/96 |
| 2015/0146140 | A1* | 5/2015 | Saneto | .................... G02B 1/14 349/96 |
| 2016/0033687 | A1* | 2/2016 | Wakizaka | ............ G02B 5/3033 359/507 |

FOREIGN PATENT DOCUMENTS

| | | | |
|---|---|---|---|
| JP | 2012088479 | * | 5/2012 |
| JP | 2012214545 | * | 11/2012 |
| JP | 2014-089270 | A | 5/2014 |
| JP | 2015-072385 | A | 4/2015 |
| KR | 20120058418 | A | 6/2012 |
| KR | 20140143452 | A | 12/2014 |
| WO | 2013/187134 | A1 | 12/2013 |

OTHER PUBLICATIONS

International Search Report issued in PCT/JP2016/071225 dated Oct. 4, 2016.
Written Opinion issued in PCT/JP2016/071225 dated Oct. 4, 2016.
International Preliminary Report on Patentability completed by WIPO dated Jan. 23, 2018, in connection with International Patent Application No. PCT/JP2016/071225.

* cited by examiner

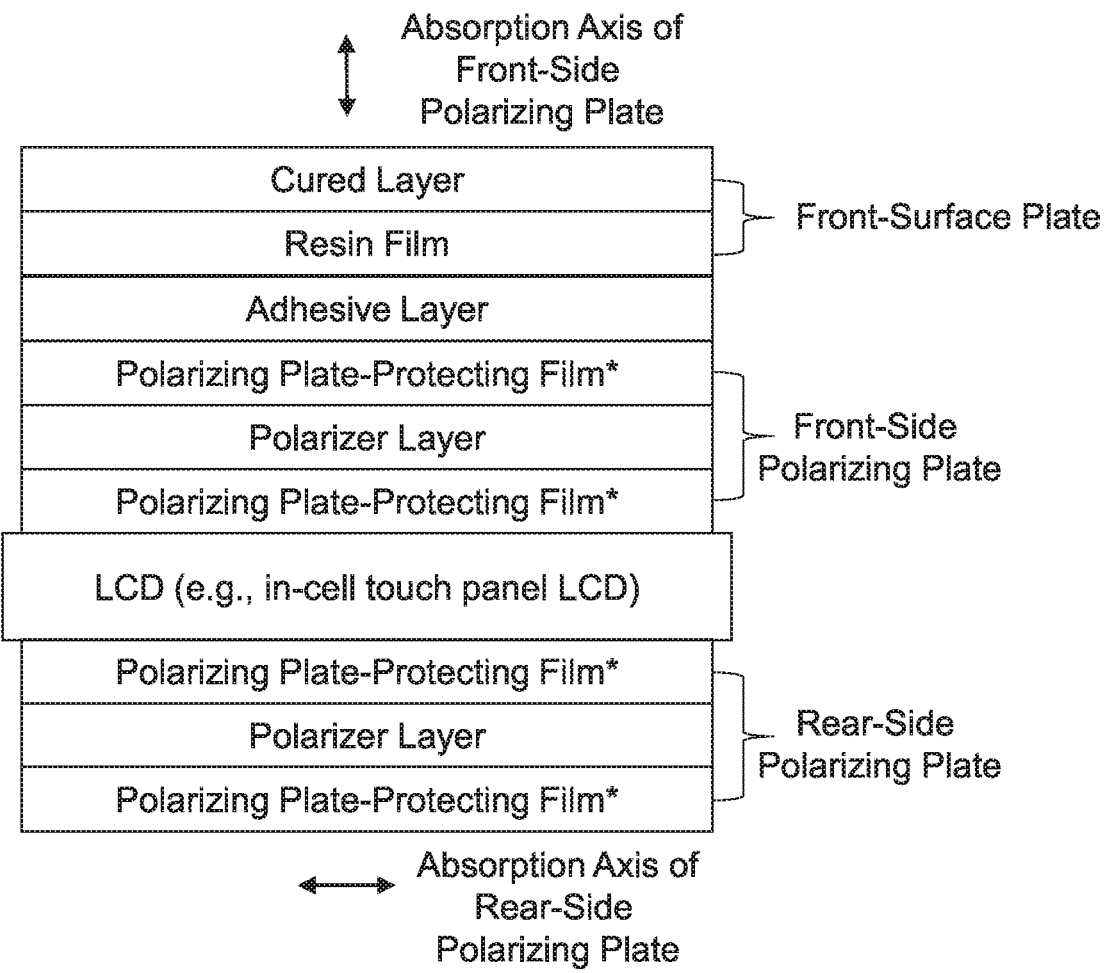

LIQUID CRYSTAL PANEL AND LIQUID CRYSTAL DISPLAY DEVICE

CROSS-REFERENCE TO RELATED APPLICATIONS

This application is a Continuation of PCT International Application No. PCT/JP2016/071225 filed on Jul. 20, 2016, which was published under PCT Article 21(2) in Japanese, and which claims priority under 35 U.S.C. § 119(a) to Japanese Patent Application No. 2015-144446 filed on Jul. 21, 2015. The above applications are hereby expressly incorporated by reference, in their entirety, into the present application.

BACKGROUND OF THE INVENTION

1. Field of the Invention

The present invention relates to a liquid crystal panel, and a liquid crystal display device including the liquid crystal panel.

2. Description of the Related Art

A liquid crystal display device includes a liquid crystal panel and a backlight unit. Further, the liquid crystal panel is usually configured such that a front-surface plate, a polarizing plate, a liquid crystal display element, and a polarizing plate are disposed in the direction from the viewing side to the backlight unit side. Hereinafter, out of two polarizing plates, a polarizing plate which is positioned nearer to the front-surface plate is referred to as a "front-side polarizing plate", and a polarizing plate which is positioned nearer to the backlight unit is referred to as a "rear-side polarizing plate".

As the polarizing plate, a polarizing plate configured such that a polarizer layer (also referred to as a polarizing film or a polarizer) is positioned between two polarizing plate-protecting films is currently widely used. Hereinafter, out of the two polarizing plate-protecting films included in the polarizing plate, a polarizing plate-protecting film positioned on the side of the liquid crystal display element is referred to as an "inner protective film" and the other polarizing plate-protecting film is referred to as an "outer protective film".

On the other hand, in a front-surface plate of a liquid crystal display device, glasses such as a chemically reinforced glass have been mainly used in the related art. In contrast, plastics have characteristics of light weight, excellent workability, low cost, and excellent transparency, compared with glass. As a result, in applications where mainly glasses have been used in recent years, the utility of plastics as an alternative material for glass has drawn attention. Under such circumstances, for example, JP2014-89270A proposes to use an optical laminate including a resin film (described as a plastic film in JP2014-89270A) as a front-surface plate of a liquid crystal display device. JP2014-89270A also proposes to laminate an optical laminate and a polarizer layer by bonding (described as a polarizing film in JP2014-89270A).

SUMMARY OF THE INVENTION

Meanwhile, JP2014-89270A discloses that bonding the polarizer layer with the optical laminate is performed by exploiting a water adhesion action of a polyvinyl alcohol (PVA)-based polarizing film without intervention of another adhesive layer (see paragraphs 0037 and 0051 in JP2014-89270A). Meanwhile, a polarizing plate which is currently widely used is configured such that a polarizer layer is positioned between two polarizing plate-protecting films as described above. In a case of bonding such a polarizing plate with a front-surface plate, the surface of the polarizing plate, with which the front-surface plate is bonded, becomes the surface of the polarizing plate-protecting film (specifically, the outer protective film of the front-side polarizing plate). Accordingly, in this case, it is considered that the front-surface plate is bonded with the front-side polarizing plate via an adhesive layer. Further, also in a case where the polarizer layer is directly bonded with the front-surface plate, it is considered to use an adhesive layer from the viewpoint of enhancing the adhesiveness between the polarizer layer and the front-surface plate.

On the other hand, recently, environments in which liquid crystal display devices are used are diverse, and there are some cases where a liquid crystal display device is used in a high-humidity environment, such as inside of cars in a rainy season and a summer season. Incidentally, the high-humidity environment is, for example, an environment at a relative humidity of 80% or more. However, as a result of extensive studies conducted by the present inventors, it became apparent that in a case where a liquid crystal panel is configured by bonding a front-surface plate including a resin film instead of glass with a front-side polarizing plate via an adhesive layer, a liquid crystal display device including the liquid crystal panel has occurrence of a phenomenon that unevenness occurs on a display surface in a high-humidity environment (specifically, a phenomenon that a region in which whiteness is partially observed in the display surface during black display is generated; hereinafter referred to as "display unevenness").

Therefore, the present invention has an object to provide a liquid crystal panel including a polarizing plate formed by bonding a front-surface plate including at least a resin film with a front-side polarizing plate via an adhesive layer, in which occurrence of display unevenness in a high-humidity environment is reduced in a case where the liquid crystal panel is assembled into a liquid crystal display device.

The present inventors have conducted extensive studies in order to accomplish the object, and have thus focused on the display unevenness to be broadly classified into two types. One type out of the both is display unevenness with circular unevenness, in which whiteness is observed in the central portion of a display surface during black display (hereinafter referred to as "circular unevenness"), and the other type is display unevenness with annular unevenness, in which whiteness is observed in the peripheral portion of a display surface during black display (hereinafter referred to as "annular unevenness").

The present inventors have further conducted extensive studies in order to reduce the two types of display unevenness, and as a result, have newly discovered the following liquid crystal panel.

A liquid crystal panel having a front-surface plate, a front-side polarizing plate, a liquid crystal display element, and a rear-side polarizing plate in an integrally laminated state, in which the front-surface plate includes at least a resin film, the front-surface plate and the front-side polarizing plate are in a state of being laminated via an adhesive layer having a thickness of 2 μm or more, the absorption axis of the front-side polarizing plate is perpendicular to the absorption axis of the rear-side polarizing plate, and the liquid crystal panel satisfies Formula A-1.

$$2020 \ \mu mGPA > ECp \times dCp \times \varepsilon Cp \times (100-P) + (Ef \times df \times \varepsilon f) - (Er \times dr \times \varepsilon r) > 0 \ \mu mGPA \quad \text{Formula A-1:}$$

In the formula, ECp is the modulus of elasticity of the front-surface plate in a unit of GPa, dCp is the thickness of the front-surface plate in a unit of μm, εCp is the humidity dimensional change rate of the front-surface plate in a unit of %, Ef is the modulus of elasticity of the front-side polarizing plate in a unit of GPa, df is the thickness of the front-side polarizing plate in a unit of μm, εf is the humidity dimensional change rate of the front-side polarizing plate in a unit of %, Er is the modulus of elasticity of the rear-side polarizing plate in a unit of GPa, dr is the thickness of the rear-side polarizing plate in a unit of μm, εr is the humidity dimensional change rate of the rear-side polarizing plate in a unit of %, and P is the stress relaxation rate of the adhesive layer in a unit of %. That is, it became apparent that by a liquid crystal display device including the liquid crystal panel, it is possible to reduce display unevenness (circular unevenness and annular unevenness) in a high-humidity environment. Presumptions conducted by the present inventors on this point will be described later.

Here, an "integrally laminated state" in the present invention is used in a sense excluding a state where other constitutive members are simply arranged on a given constitutive member in a liquid crystal panel. For example, a state where a given constitutive member and another constitutive member are adhered to each other by an interlayer for bonding two constitutive members, such as an adhesive layer, a state where a given constitutive member and another constitutive member are adhered to each other by lamination processing using an adhesive or lamination processing (thermal compression) not using an adhesive, and other states are encompassed by the "integrally laminated state".

In the liquid crystal panel, the respective constitutive members as described above are in an integrally laminated state. In a liquid crystal panel in which the respective constitutive members are in an integrally laminated state, in a case where a given constitutive member absorbs moisture in a high-humidity environment to cause deformation (humidity dimensional change), the deformation gives an effect on another constitutive member. As a result, the entire liquid crystal panel can be deformed. For a front-surface plate including a glass widely used in the related, it is considered that since a glass has a low moisture permeability and a small humidity dimensional change, as compared with a resin film, the degrees of deformation of the front-surface plate and the other constitutive members in a high-humidity environment are small. In contrast, it is presumed that a liquid crystal panel having a front-surface plate including a resin film has a larger deformation of the front-surface plate itself, and a large deformation of the other constitutive members, generated by the effect of moisture penetrated into the front-surface plate than those of a liquid crystal panel having a front-surface plate including a glass in a high-humidity environment.

With regard to this point, the present inventors have presumed that out of the above-described two types of display unevenness, the annular unevenness occurs due to a fact that constitutive members (for example, a polarizing plate-protecting film and a phase difference plate as optionally installed) capable of generating a phase difference, included in the liquid crystal panel, cause a phase difference distribution (phase difference unevenness) within a plane by deformation. In contrast, it is presumed by the present inventors that the circular unevenness occurs by a partial contact between the backlight unit and the liquid crystal panel due to the deformation of the entire liquid crystal panel.

Furthermore, the present inventors have repeatedly conducted extensive studies, based on a consideration that by deforming the entire liquid crystal panel to be in a convex shape on the viewing side to an extent that occurrence of annular unevenness can be suppressed in a high-humidity environment, occurrence of circular unevenness caused by the contact between the liquid crystal panel and the backlight unit can be suppressed, and thus, the two types of display unevenness presumed to occur by the respective causes above can both be suppressed. As a result, they have discovered the liquid crystal panel. Specifically, the present inventors have presumed as follows.

The present inventors have thought that the deformation direction (whether the liquid crystal panel is deformed to be in a convex shape on the viewing side or deformed to be in a convex shape on the backlight unit side) and the strength (to what extent the liquid crystal panel is deformed) of the liquid crystal panel having a front-surface plate, a front-side polarizing plate, a liquid crystal display element, and a rear-side polarizing plate in an integrally laminated state in a high-humidity environment usually varies depending on a balance of stress between the front-surface plate and the front-side polarizing plate (hereinafter also collectively referred to as a "viewing-side member") positioned on the viewing side of the liquid crystal display element, and the rear-side polarizing plate. Further, the present inventors have presumed that the stress of the respective constitutive members in a high-humidity environment can be indicated by "Modulus of elasticity×Thickness×Humidity dimensional change rate which will be described later" of the respective constitutive members as an index. Here, the present inventors have thought that the stress of the viewing-side member is also changed by an extent that an adhesive layer positioned between the front-surface plate and the front-side polarizing plate transfers the stress of the front-surface plate to the front-side polarizing plate which is integrally laminated therewith, the stress relaxation rate of the adhesive layer, details of which will be described later can be used as an indicator. Further, the present inventors have presumed that in order to make the adhesive layer play a role in controlling the deformation of the entire liquid crystal panel, the thickness should be 2 μm or more. Incidentally, the present inventors have presumed that taking into account the stress relaxation rate of the adhesive layer, a difference between "ECp×dCp×εCp×(100−P)/100+(Ef×df×εf)" for the viewing-side member of Formula A-1 as described above and "(Er×dr×εr)" for the rear-side polarizing plate can be indicative of a balance of stress between the viewing-side member and the rear-side polarizing plate in a high-humidity environment, and by making the difference satisfy Formula A-1, the entire liquid crystal panel can be deformed to be in a convex shape on the viewing side to an extent that occurrence of annular unevenness can be suppressed in a high-humidity environment, and thus, occurrence of circular unevenness can be suppressed.

However, these are all the presumptions of the present inventors, and do not limit the present invention.

In the present invention and the present specification, the "modulus of elasticity" of the respective constitutive members is a value measured by the following method, in accordance with the method described in JIS K7127.

The measurement directions are the longitudinal direction with respect to the front-surface plate, the absorption axis direction of the polarizer layer included in the polarizing plate with respect to the front-side polarizing plate, or the direction perpendicular to the absorption axis of the polarizer layer included in the polarizing plate with respect to the rear-side polarizing plate. These are the same as for the measurement directions in the measurement of the humidity dimensional change rate which will be described later. A sample for measurement with a length of 15 cm in the measurement direction and a width of 1 cm is cut out from the respective constitutive members. The sample for measurement thus cut is installed in a tensile tester (for example, STROGRAPH-R2 manufactured by Seiki Seisaku-Sho, Ltd.) so that a chuck interval in the measurement direction reaches 10 cm, a load is applied so that the chuck interval widens at a stretching rate of 10 mm/min, and the force and the elongation amount at that time are measured. The modulus of elasticity is calculated from the thickness of the sample for measurement measured in advance using a micrometer, and the force and the elongation amount measured.

Furthermore, in the present invention and the present specification, the "humidity dimensional change rate" of the respective constitutive members is a value measured by the following method.

From the respective constitutive members, a sample for measurement is cut out to a length of 12 cm (measurement direction) and a width of 3 cm. Pin holes were perforated in the cut sample for measurement at an interval of 10 cm in an environment at a temperature of 25° C. and a relative humidity of 60%, and then the sample for measurement was transferred to an environment at a temperature of 25° C. and a relative humidity of 80%, and left to stand in the same environment for 24 hours. Immediately thereafter, the intervals between the pin holes were measured with a pin gauge in the same environment. Here, the measured interval of the pin hole is defined as $LA_1$ cm.

Next, the sample for measurement was transferred to an environment at a temperature of 25° C. and a relative humidity of 10%, and left to stand in the same environment for 24 hours. Immediately thereafter, the intervals between the pin holes were measured with a pin gauge in the same environment. Here, the measured interval of the pin hole is defined as $LC_0$ cm.

Using these measured values, a humidity dimensional change rate is calculated in accordance with the following formula.

Humidity dimensional change rate [%]={($LA_1$ [cm]–$LC_0$ [cm])/10 [cm]}×100

The "thickness" in the present invention and in the present specification is a value measured by observation by means of a scanning electron microscope (SEM). For example, a cross-section of the respective constitutive members or members (for example, a liquid crystal panel or a part thereof) including the respective constitutive members is exposed by a known method such as ion beams and microtomes, and then observation of the cross-section is performed using SEM in the exposed cross-section. Various thicknesses such as a thickness determined at one site in the thickness direction and a thickness as an arithmetic mean of thicknesses determined at randomly adopted two or more sites, for example, two sites, in the cross-section observation can also be determined.

Moreover, the "stress relaxation rate" of the adhesive layer in the present invention and the present specification is a value measured by the following method.

A member including an adhesive layer to be measured was cut out to a width of 10 mm×a length of 160 mm, and it was continued to be under tension at a tensile rate of 200 mm/min from a distance between chucks of 100 mm to a distance between chucks of 110 mm, and stopped at a 10% elongation state (10% elongation), using a tensile tester (for example, a Tensilon tester manufactured ORIENTEC), in an environment at a temperature of 23° C. and a relative humidity of 60%. A load (residual stress) after lapsing 600 seconds from the stop was measured, and a stress relaxation rate was obtained by using the following calculation formula.

Stress relaxation rate [%]={(load [N] at 10% elongation–load [N] after lapsing 600 seconds from stop at 10% elongation)/load [N] at 10% elongation}×100

The respective measured values described above can be measured by separating constitutive members to be measured from other constitutive members in a liquid crystal panel in which the respective constitutive members are in an integrally laminated state, or a part thereof, by a known method.

In one aspect, the front-surface plate has a modulus of elasticity ECp in a range of 3.5 to 9.0 GPa, a humidity dimensional change rate εCp in a range of 0.15% to 0.70%, and a thickness dCp in a range of 120 to 400 μm.

In one aspect, the adhesive layer has a stress relaxation rate P in a range of 20% to 80%.

In one aspect, the front-surface plate has a cured layer formed by curing an actinic energy ray-curable composition on a surface of the resin film on the side opposite to the front-side polarizing plate side.

In one aspect, the front-side polarizing plate and the rear-side polarizing plate each have two polarizing plate-protecting films, and a polarizer layer positioned between the two polarizing plate-protecting films.

In one aspect, at least one of the polarizing plate-protecting films includes a cellulose acylate film.

In one aspect, the polarizing plate-protecting film (inner protective film) positioned on at least the liquid crystal display element side of the front-side polarizing plate, and the polarizing plate-protecting film (inner protective film) positioned on at least the liquid crystal display element side of the rear-side polarizing plate include a cellulose acylate film.

In one aspect, the polarizer layer included in the front-side polarizing plate and the polarizer layer included in the rear-side polarizing plate are each an iodine-containing (iodine-dyed) polyvinyl alcohol-based film.

In one aspect, the adhesive layer is a layer including an acrylic pressure-sensitive adhesive. Further, in the present invention and the present specification, the "adhesive layer" is a layer which bonds given two constitutive members, and the "adhesion" encompasses adhesion caused by a pressure-sensitive adhesive and adhesion caused by an adhesive. The "pressure-sensitive adhesive" is an agent which has an intermediate property (gel) between liquid and solid, and maintains the property (gel) even after the bonding of the two constitutive members. In contrast, the "adhesive" refers to an agent which is a liquid before bonding the two constitutive members, but becomes solid after bonding them. In addition, the "acrylic pressure-sensitive adhesive" refers to a pressure-sensitive adhesive having a polymer of a (meth)acrylic ester as a main component. The "(meth)

acrylic ester" means either or both of an acrylic ester and a methacrylic ester. The main component refers to a component which occupies the most part among the pressure-sensitive adhesives, for example, 50% by mass or more in terms of mass.

Moreover, in an aspect in which the front-surface plate includes the "easily adhesive layer" which will be described later, the easily adhesive layer becomes the outermost layer on the adhesive layer side of the front-surface plate, and its surface becomes the surface bonded with the adhesive layer. The easily adhesive layer can play a role in improving the adhesion force between the front-surface plate and the adhesive layer, and encompasses an easily adhesive layer caused by a pressure-sensitive adhesive and an easily adhesive layer caused by an adhesive. The pressure-sensitive adhesive and the adhesive are as set forth above.

In one aspect, at least any one part (for example, the cured layer, the resin film included in the front-surface plate, the adhesive layer, the front-side polarizing plate (for example, two polarizing plate-protecting films), the liquid crystal display element, and the rear-side polarizing plate (for example, any one or more of the two polarizing plate-protecting films)) constituting the liquid crystal panel includes an antistatic agent.

In one aspect, the liquid crystal display element is an in-cell touch panel liquid crystal display element.

In one aspect, the liquid crystal display element is an on-cell touch panel liquid crystal display element.

Another aspect of the present invention relates to a liquid crystal display device including the liquid crystal panel and a backlight unit.

According to one aspect of the present invention, it is possible to provide a liquid crystal panel including a polarizing plate having a front-surface plate including at least a resin film, and a front-side polarizing plate, bonded via an adhesive layer, in which occurrence of both circular unevenness and annular unevenness in a high-humidity environment is suppressed in a case where the liquid crystal panel is assembled into a liquid crystal display device; and a liquid crystal display device including the liquid crystal panel.

BRIEF DESCRIPTION OF THE DRAWINGS

The sole FIGURE illustrates an example of a liquid crystal panel according to an aspect of the present invention.

DESCRIPTION OF THE PREFERRED EMBODIMENTS

Hereinafter, the present invention will be described based on typical embodiments in some cases, but the present invention is not limited to such embodiments. In the present invention and the present specification, a range of numerical values described using "to" means a range which includes the numerical values listed before and after "to" as a lower limit and an upper limit. Further, in the present invention and the present specification, a description regarding an angle such as orthogonality or a direction means that the angle or the direction includes a margin of error accepted in the technical field to which the present invention belongs. For example, the description means that the angle is within a range less than a precise angle±10°, and a difference between the angle and the precise angle is preferably 5° or less, and more preferably 3° or less.

[Liquid Crystal Panel]

One aspect of the present invention relates to a liquid crystal panel, as shown in the sole FIGURE, having a front-surface plate, a front-side polarizing plate, a liquid crystal display element, and a rear-side polarizing plate in an integrally laminated state, in which the front-surface plate includes at least a resin film, the front-surface plate and the front-side polarizing plate are in a state of being laminated (bonded) via an adhesive layer, and the liquid crystal panel satisfies Formula A-1 as described above.

Hereinafter, the liquid crystal panel will be described in more detail.

<Configuration of Liquid Crystal Panel>

The liquid crystal panel has a front-surface plate, a front-side polarizing plate, a liquid crystal display element, and a rear-side polarizing plate in an integrally laminated state. The integrally laminated state is as set forth above. Incidentally, the front-surface plate and the front-side polarizing plate are in a state of being laminated (bonded) via an adhesive layer having a thickness of 2 μm or more. Further, the adhesive layer may also be optionally present between the other constitutive members.

<Formula A-1>

Formula A-1 satisfied by the liquid crystal panel is the following formula.

$$2020\ \mu mGPA > ECp \times dCp \times \varepsilon Cp \times (100-P) + (Ef \times df \times \varepsilon f) - (Er \times dr \times \varepsilon r) > 0\ \mu mGPA \quad \text{Formula A-1:}$$

In the formula, ECp is the modulus of elasticity of the front-surface plate, dCp is the thickness of the front-surface plate, and εCp is the humidity dimensional change rate of the front-surface plate. Ef is the modulus of elasticity of the front-side polarizing plate, df is the thickness of the front-side polarizing plate, and εf is the humidity dimensional change rate of the front-side polarizing plate. Er is the modulus of elasticity of the rear-side polarizing plate, dr is the thickness of the rear-side polarizing plate, and εr is the humidity dimensional change rate of the rear-side polarizing plate. The unit of various moduli of elasticity is GPa, the unit of various thicknesses is μm, and the unit of various humidity dimensional change rates is %. Further, P is the stress relaxation rate of the adhesive layer which bonds the front-surface plate with the front-side polarizing plate in a unit of %. Methods for measuring those are as set forth above. As described above, the present inventors have presumed that the liquid crystal panel satisfying Formula A-1 can deform the entire liquid crystal panel to be in a convex shape on the viewing side to an extent that occurrence of annular unevenness can be suppressed, whereby occurrence of circular unevenness and occurrence of annular unevenness can both be suppressed in a high-humidity environment. However, this is only a presumption, and does not limit the present invention. From the viewpoint of further suppressing the occurrence of circular unevenness and annular unevenness, it is preferable that Formula A-1 is preferably Formula A-1(1), and more preferably Formula A-1(2).

$$550 > ECp \times dCp \times \varepsilon Cp \times (100-P)/100 + (Ef \times df \times \varepsilon f) - (Er \times dr \times \varepsilon r) > 30 \quad \text{Formula A-1(1):}$$

$$250 > ECp \times dCp \times \varepsilon Cp \times (100-P)/100 + (Ef \times df \times \varepsilon f) - (Er \times dr \times \varepsilon r) > 50 \quad \text{Formula A-1(2):}$$

With regard to Formula A-1, by adjusting the modulus of elasticity, the dimensional change rate, the thickness, and the stress relaxation rate of the adhesive layer of the respective constitutive members, it is possible to obtain a liquid crystal panel satisfying Formula A-1. Such the adjustment will be described later.

Hereinafter, the respective constitutive members of the liquid crystal panel will be sequentially described.

<Front-Surface Plate>

The front-surface plate is a constitutive member position on the viewing side more than the front-side polarizing plate in the liquid crystal panel, and provided for the purpose of protecting the surface of the liquid crystal panel. In one aspect of the liquid crystal panel according to the present invention, the front-surface plate includes at least a resin film. Further, in the present invention and the present specification, the resin film refers to a film including a resin as a constitutive component. Further, the resin layer refers to a layer including a resin as a constitutive component. For the resin film and the resin layer, the component mainly constituting the film or the layer is preferably a resin. In the resin film or the resin layer, the resin can account for, for example, 50% by mass or more, preferably 60% by mass or more, and more preferably 70% by mass. The resin is a polymer formed by the polymerization of the same or different two or more polymerizable compounds. The polymer may be a homopolymer or a copolymer. Further, the polymer encompasses various multimers generally called oligomers or polymers.

<<Resin Film>>

The resin film included in the front-surface plate may be a single layer film formed of a single resin layer or a laminated film consisting of two or more resin layers. Such the resin film is available as commercially available products, or can be produced by a known film forming method. Examples of resin films which can be used as the resin film included in the base material include an acrylic resin film, a polycarbonate-based resin film, a polyolefin-based resin film, a polyester-based resin film, and an acrylonitrile-butadiene-styrene copolymer (ABS) film. Further, the acrylic resin refers to a polymer of a (meth)acrylic ester. The polycarbonate-based resin refers to a resin having a polycarbonate moiety. For other resins and compounds, the "system" means a moiety described before this term ("system") unless otherwise indicated. In addition, as the resin film, a known cellulose acylate film such as a polarizing plate-protecting film can be used.

In one preferred aspect, the resin film included in the front-surface plate includes at least one film selected from the group consisting of an acrylic resin film and a polycarbonate-based resin film. Further, in one preferred aspect, the resin film included in the front-surface plate is a laminated film formed of two or more layers of resin films. Herein, the number of layers laminated is, for example, 2 or 3, but is not particularly limited. As an example of a preferred resin film (laminated film), a laminated film having an acrylic resin film, a polycarbonate-based resin film, and an acrylic resin film in this order can be exemplified.

Furthermore, the acrylic resin film is a resin film of one or more polymerizable compounds selected from the group consisting of an acrylic ester and a methacrylic ester, and examples thereof include a polymethyl methacrylate resin (PMMA) film. Other examples of the acrylic resin film preferably include a cellulose acylate film having a multi-layer structure such as a monolayer, a bilayer, a trilayer, or a higher-layer, and a polyester-based resin film.

(Optional Component of Resin Film)

The resin film can also optionally include one or more kinds of other components such as known additives, in addition to the resin. As an example of such the components which can be optionally included, an ultraviolet absorbent, an antistatic agent, and the like can be exemplified. The antistatic agent will be described in detail. Examples of the ultraviolet absorbent include a benzotriazole compound and a triazine compound. Here, the benzotriazole compound is a compound having a benzotriazole ring, and specific examples thereof include various benzotriazole-based ultraviolet absorbents described in paragraph 0033 of JP2013-111835A. The triazine compound is a compound having a triazine ring, and specific examples thereof include various triazine-based ultraviolet absorbents described in paragraph 0033 of JP2013-111835A. The content of the ultraviolet absorbent in the resin film is, for example, approximately 0.1 to 10 parts by mass with respect to 100 parts by mass of the resin contained in the film, but is not particularly limited. Further, with regard to the ultraviolet absorbent, reference can be made to paragraph 0032 of JP2013-111835A. In addition, the ultraviolet rays in the present invention and the present specification refer to light having a central light emission wavelength in a wavelength range of 200 to 380 nm.

(Thickness of Resin Film)

The thickness of the resin film is, for example, in a range of 100 to 300 μm, preferably in a range of 100 to 260 μm, and more preferably in a range of 100 to 220 μm.

<<Layer which can be Optionally Provided in Front-Surface Plate>>

(Cured Layer Formed by Curing Actinic Energy Ray-Curable Composition)

Examples of the layer include a layer provided on the viewing side of the resin film, that is, a cured layer (hereinafter also described as an "actinic energy ray-curable layer") formed by curing an actinic energy ray-curable composition, which is a layer provided on a surface of the resin film on the side opposite to the front-side polarizing plate side (in other words, the adhesive layer side). Further, in the present invention and the present specification, the "actinic energy rays" refer to ionizing radiation, and examples thereof include X-rays, ultraviolet rays, visible light, infrared rays, electron beams, α-rays, β-rays, and γ-rays. Incidentally, actinic energy ray curability refers to a property of being curable by irradiation with actinic energy rays. Hereinafter, specific aspects of the actinic energy ray-curable layer will be described, but the present invention is not limited to the following aspects.

The actinic energy ray-curable composition used for formation of an actinic energy ray-curable layer includes at least one kind of component (hereinafter also described as an "actinic energy ray-curable component") having a property of being cured by irradiation with actinic energy rays. As the actinic energy ray-curable component, at least one kind of polymerizable compound selected from the group consisting of a radically polymerizable compound and a cationically polymerizable compound is preferable. Incidentally, in the present invention and the present specification, the "polymerizable compound" is a compound including one or more polymerizable groups per molecule. The polymerizable group is a group which can be involved in a polymerization reaction, and specific examples thereof include compounds included in the various polymerizable compounds which will be described later. Further, examples of the polymerization reaction include various polymerization reactions such as radical polymerization, cationic polymerization, and anionic polymerization. In a first aspect, preferred aspects of the actinic energy ray-curable composition include an actinic energy ray-curable composition including at least one kind of polymerizable compound having two or more ethylenically unsaturated groups per molecule. The ethylenically unsaturated group refers to a functional group containing an ethylenically unsaturated double bond. Further, a second aspect of the actinic energy ray-curable composition includes an actinic energy ray-curable composition including at least one kind of radically polymerizable compound and at least one kind of cationically polymerizable compound.

Hereinafter, the actinic energy ray-curable composition in the first aspect will be described.

Examples of the polymerizable compound having two or more ethylenically unsaturated groups per molecule, included in the actinic energy ray-curable composition, include an ester of a polyhydric alcohol and a (meth)acrylic acid [for example, ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, and polyester polyacrylate], an ethylene oxide modified form of the above-mentioned ester, a polyethylene oxide modified form, a caprolactone modified form, vinylbenzene and a derivative thereof [for example, 1,4-divinylbenzene, a 2-acryloylethyl 4-vinylbenzoate ester, and 1,4-divinylcyclohexanone], a vinylsulfone (for example, divinylsulfone), an acrylamide (for example, methylenebisacrylamide), and a methacrylamide. Further, the "(meth)acrylate" described in the present specification is used to mean any of either and both of an acrylate and a methacrylate. In addition, the "(meth)acryloyl group" which will be described later is used to mean any of either and both of an acryloyl group and a methacryloyl group. The "(meth)acryl" is used to mean any of either and both of an acryl and a methacryl.

The above-mentioned polymerizable compound may be used singly or in combination of two or more kinds hereof having different structures. Further, similarly, the respective components described in the present specification may be used singly or in two or more kinds thereof having different structures, and further, in a case of using two or more kinds of the components having different structures, the content of the respective components refers to a total content of the components.

As described later, in one aspect, the actinic energy ray-curable composition can include a polyrotaxane. In this case, in a case where the linear molecule (details thereof will be described later) of the polyrotaxane is a polyalkylene glycol, it is preferable that at least some of the polymerizable compounds having two or more ethylenically unsaturated groups are an ethylene oxide modified form or a polyethylene oxide modified form.

In particular, in a case where the linear molecule of the polyrotaxane is polyethylene glycol, it is preferable that an ethylene oxide modified form is included as at least some of the polymerizable compounds having two or more ethylenically unsaturated groups. By incorporation of an ethylene oxide modified form, compatibility between the polymerizable compound and polyrotaxane can be increased, and thus, an increase in the haze of the actinic energy ray-curable layer can be suppressed.

Polymerization of the polymerizable compounds having ethylenically unsaturated groups can be carried out by irradiation with actinic energy rays in the presence of a radical photopolymerization initiator.

Next, the actinic energy ray-curable composition in the second aspect will be described.

The actinic energy ray-curable composition in the second aspect includes at least one kind of radically polymerizable compound and at least one kind of cationically polymerizable compound. In a preferred aspect, an actinic energy ray-curable composition including:

a radically polymerizable compound including two or more radically polymerizable groups selected from the group consisting of an acryloyl group and a methacryloyl group per molecule, and a cationically polymerizable compound can be exemplified.

The actinic energy ray-curable composition more preferably includes a radical photopolymerization initiator and a cationic photopolymerization initiator. In a preferred aspect of the second aspect, an actinic energy ray-curable composition including:

a radically polymerizable compound including two or more radically polymerizable groups selected from the group consisting of an acryloyl group and a methacryloyl group per molecule, a cationically polymerizable compound, a radical photopolymerization initiator, and a cationic photopolymerization initiator can be exemplified. Hereinafter, the present aspect will be described as a second aspect (1).

In the second aspect (1), the radically polymerizable compound preferably includes one or more urethane bonds per molecule, together with two or more radically polymerizable groups per molecule.

In one preferred aspect other than the second aspect, an actinic energy ray-curable composition including:

a) an cationically polymerizable compound including an alicyclic epoxy group and an ethylenically unsaturated group, in which the number of the alicyclic epoxy groups included per molecule is 1, the number of the ethylenically unsaturated group included per molecule is 1, and the molecular weight of the compound is 300 or less, b) a radically polymerizable compound including 3 or more ethylenically unsaturated groups per molecule, c) a radical polymerization initiator, and d) a cationic polymerization initiator can be exemplified. Hereinafter, the present aspect will be described as a second aspect (2). In a case where the total solid content of the cured layer is 100% by mass, it is preferable that a cured layer formed by curing the actinic energy ray-curable composition of the second aspect (2) includes 15% to 70% by mass of a structure derived from a), 25% to 80% by mass of a structure derived from b), 0.1% to 10% by mass of a structure derived from c), and 0.1% to 10% by mass of a structure derived from d). Further, in one aspect, in a case where the total solid content of the actinic energy ray-curable composition is 100% by mass, it is preferable that the actinic energy ray-curable composition of the second aspect (2) includes 15% to 70% by mass of a). Incidentally, the "alicyclic epoxy group" refers to a monovalent functional group having a cyclic structure in which an epoxy ring and a saturated hydrocarbon ring are condensed.

Hereinafter, various components which can be included in the actinic energy ray-curable composition in the second aspect, and preferably the second aspect (1) or the second aspect (2) will be described in more detail.

—Radically Polymerizable Compound—

The actinic energy ray-curable composition in the second aspect includes at least one kind of radically polymerizable compound and at least one kind of cationically polymerizable compound. The radically polymerizable compound in the second aspect (1) includes two or more radically polymerizable groups selected from the group consisting of an acryloyl group and a methacryloyl per molecule. The radically polymerizable compound can include preferably, for example, 2 to 10 radically polymerizable groups, and more preferably 2 to 6 radically polymerizable groups, selected from the group consisting of an acryloyl group and a methacryloyl group, per molecule.

As the radically polymerizable compound, a radically polymerizable compound having a molecular weight of 200 or more and less than 1,000 is preferable. Further, in the present invention and the present specification, with regard to a polymer, a molecular weight refers to a weight-average molecular weight measured by gel permeation chromatography (GPC) in terms of polystyrene unless otherwise specified. As a specific example of the measurement conditions for the weight-average molecular weight, the following conditions can be exemplified.
GPC device: HLC-8120 (manufactured by Tosoh Corporation): Column: TSK gel Multipore HXL-M (manufactured by Tosoh Corporation, inner diameter 7.8 mmID×30.0 cm)
Eluent: Tetrahydrofuran (THF)

The radically polymerizable compound preferably includes one or more urethane bonds per molecule, as described above. The number of urethane bonds included per molecule of the radically polymerizable compound is preferably 1 or more, more preferably 2 or more, and still more preferably 2 to 5. For example, the number of the urethane bonds may be 2. In the radically polymerizable compound including two urethane bonds per molecule, the radically polymerizable group selected from the group consisting of an acryloyl group and a methacryloyl group may be directly bonded, or bonded through a linking group to only one of the urethane bonds, or the radically polymerizable groups can each be directly bonded, or bonded through a linking group to both of the urethane bonds. In one aspect, it is preferable that one or more of the radically polymerizable groups selected from the group consisting of an acryloyl group and a methacryloyl group are bonded to two urethane bonds that are bonded through a linking group.

More specifically, in the radically polymerizable compound, the urethane bond and the radically polymerizable group selected from the group consisting of an acryloyl group and a methacryloyl group may be directly bonded, or a linking group may be present between the urethane bond and the radically polymerizable group selected from the group consisting of an acryloyl group and a methacryloyl group. The linking group is not particularly limited, and examples thereof include a linear or branched, saturated or unsaturated hydrocarbon group, a cyclic group, and a group formed by combination of two or more thereof. The number of carbon atoms in the hydrocarbon group is, for example, approximately 2 to 20, is not particularly limited. Incidentally, examples of a cyclic structure included in the cyclic group include aliphatic rings (a cyclohexane ring and the like) and aromatic rings (a benzene ring, a naphthalene ring, and the like). The group may be unsubstituted or may have a substituent. Further, in the present invention and in the present specification, the groups described may have a substituent or may be unsubstituted unless otherwise specified. In a case where a given group has a substituent, examples of the substituent includes alkyl groups (for examples, an alkyl group having 1 to 6 carbon atoms), a hydroxyl group, alkoxy groups (for example, an alkoxy group having 1 to 6 carbon atoms), halogen atoms (for example, a fluorine atom, a chlorine atom, and a bromine atom), a cyano group, an amino group, a nitro group, an acyl group, and a carboxyl group.

The radically polymerizable compound as described above can be synthesized by a known method, or can also be obtained as a commercially available product. As an example of the synthesis method therefor, a method in which an alcohol, a polyol, and/or a hydroxyl group-containing compound such as a hydroxyl group-containing (meth) acrylate are reacted with an isocyanate, and then, as desired, a urethane compound obtained by the reaction is esterified a using (meth)acrylic acid can be exemplified. Further, the "(meth)acrylic acid" is used to mean any of either and both of an acrylic acid and a methacrylic acid.

Examples of the commercially available product of the radically polymerizable compound including one or more urethane bonds per molecule include, but are not limited to, UA-306H, UA-3061, UA-306T, UA-510H, UF-8001G, UA-101I, UA-101T, AT-600, AH-600, AI-600, BPZA-66, and BPZA-100 manufactured by KYOEISHA CHEMICAL Co., LTD., U-4HA, U-6HA, U-6LPA, UA-32P, U-15HA, and UA-1100H manufactured by shin-Nakamura Chemical Co., Ltd., SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B manufactured by NIPPON GOHSEI, UL-503LN manufactured by KYOEISHA CHEMICAL Co., LTD., UNIDIC 17-806, UNIDIC 17-813, UNIDIC V-4030, and UNIDIC V-4000BA manufactured by DIC Corporation, EB-1290K manufactured by Daicel-UCB Company, Ltd., and HICORP AU-2010 and HICORP AU-2020 manufactured by TOKUSHIKI Co., Ltd.

As specific examples of the radically polymerizable compound including one or more urethane bonds per molecule, exemplary compounds A-1 to A-8 are shown below. However, the present invention is not limited to the following specific examples.

A-1

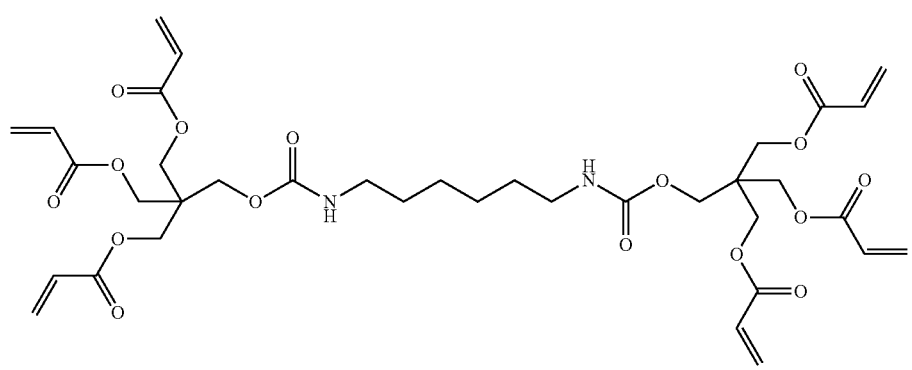

-continued
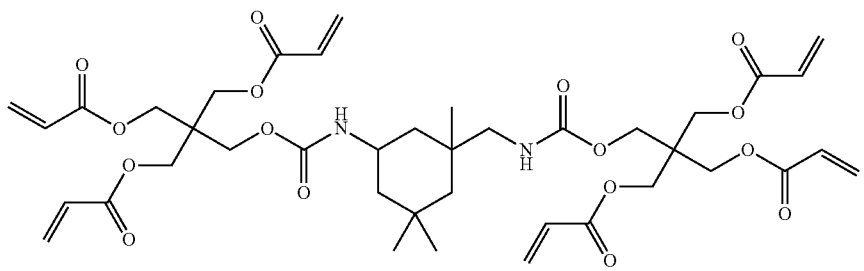
A-2
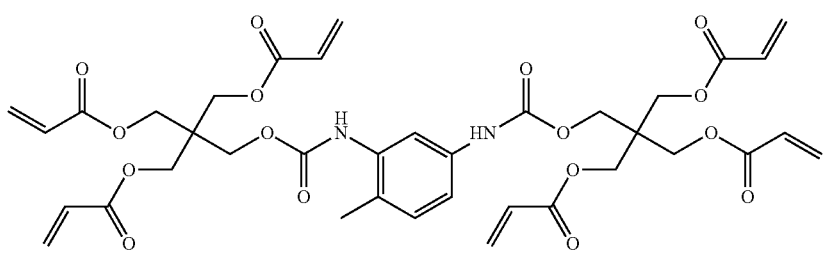
A-3
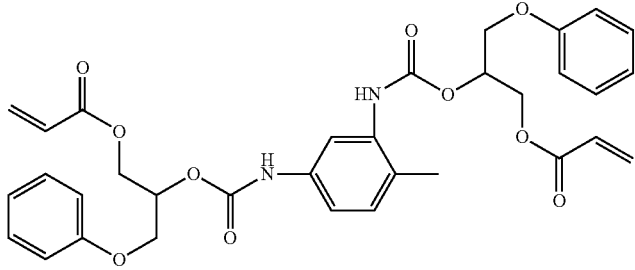
A-4
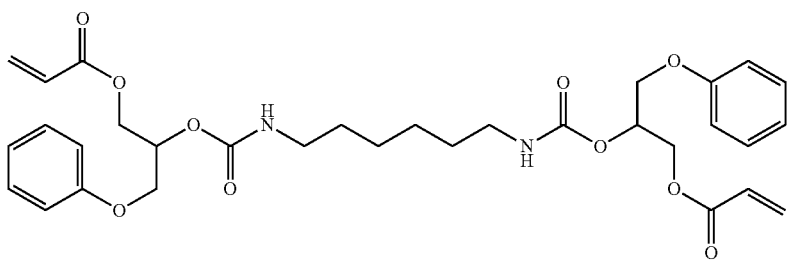
A-5
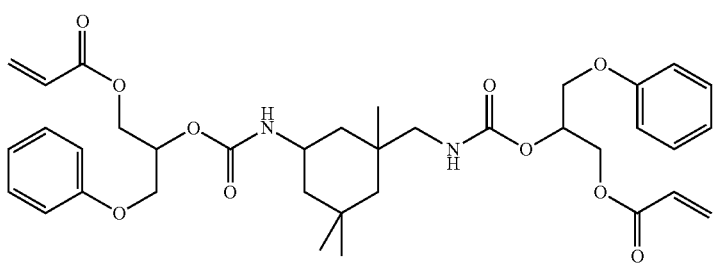
A-6
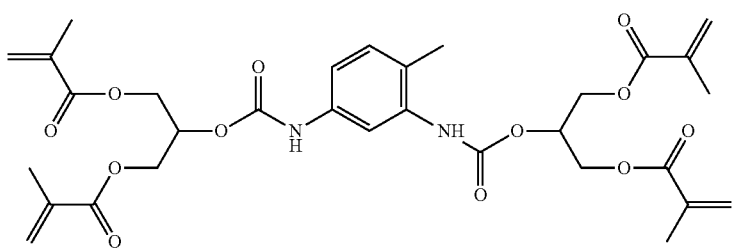
A-7

-continued

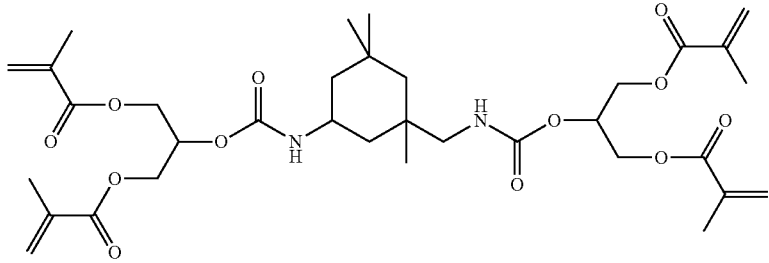

A-8

The radically polymerizable compound including one or more urethane bonds per molecule has been described above, but a radically polymerizable compound including two or more radically polymerizable groups selected from the group consisting of an acryloyl group and a methacryloyl group per molecule may not have a urethane bond. Further, the actinic energy ray-curable composition in the second aspect (1) may include one or more kinds of radically polymerizable compounds other than the radically polymerizable compound including two or more radically polymerizable groups selected from the group consisting of an acryloyl group and a methacryloyl group per molecule, in addition to such the radically polymerizable compound.

Hereinafter, the radically polymerizable compound including two or more radically polymerizable groups selected from the group consisting of an acryloyl group and a methacryloyl group per molecule, and including one or more urethane bonds per molecule is described as a first radically polymerizable compound, and a radically polymerizable compound not corresponding to the first radically polymerizable compound is described as a "second radically polymerizable compound" irrespective of whether it includes two or more radically polymerizable groups selected from the group consisting of an acryloyl group and a methacryloyl group per molecule. The second radically polymerizable compound may or may not have one or more urethane bonds per molecule. In a case where the first radically polymerizable compound and the second radically polymerizable compound are used in combination, a mass ratio of the first radically polymerizable compound/the second radically polymerizable compound is preferably 3/1 to 1/30, more preferably 2/1 to 1/20, and still more preferably 1/1 to 1/10.

The content of the radically polymerizable compound (irrespective of the presence or absence of a urethane bond) including two or more radically polymerizable groups selected from the group consisting of an acryloyl group and a methacryloyl group per molecule in the actinic energy ray-curable composition in the second aspect (1) is preferably 30% by mass or more, more preferably 50% by mass or more, and still more preferably 70% by mass or more, with respect to 100% by mass of the total amount of the composition. Further, the content of the radically polymerizable compound (irrespective of the presence or absence of a urethane bond) including two or more radically polymerizable groups selected from the group consisting of an acryloyl group and a methacryloyl group per molecule in the actinic energy ray-curable composition in the second aspect (1) is preferably 98% by mass or less, more preferably 95% by mass or less, and still more preferably 90% by mass or less, with respect to 100% by mass of the total amount of the composition.

Moreover, the content of the first radically polymerizable compound in the actinic energy ray-curable composition in the second aspect (1) is preferably 30% by mass or more, more preferably 50% by mass or more, and still more preferably 70% by mass or more, with respect to 100% by mass of the total amount of the composition. On the other hand, the content of the first radically polymerizable compound is preferably 98% by mass or less, more preferably 95% by mass or less, and still more preferably 90% by mass or less, with respect to 100% by mass of the total amount of the composition.

In one aspect, the second radically polymerizable compound is preferably a radically polymerizable compound including two or more radically polymerizable groups per molecule and having no urethane bond. The radically polymerizable group included in the second radically polymerizable compound is preferably an ethylenically unsaturated group, and in one aspect, a vinyl group is preferable. In another aspect, the ethylenically unsaturated group is preferably a radically polymerizable group selected from the group consisting of an acryloyl group and a methacryloyl group. That is, it is preferable that the second radically polymerizable compound has one or more radically polymerizable groups selected from the group consisting of an acryloyl group and a methacryloyl group per molecule and has no urethane bond. Further, the second radically polymerizable compound as the radically polymerizable compound includes one or more radically polymerizable groups selected from the group consisting of an acryloyl group and a methacryloyl group per molecule, and can also include one or more radically polymerizable groups other than the radically polymerizable groups.

The number of the radically polymerizable groups included per molecule of the second radically polymerizable compound is preferably at least 2, more preferably 3 or more, and still more preferably 4 or more. Incidentally, in one aspect, the number of the radically polymerizable groups included per molecule of in the second radically polymerizable compound is, for example, 10 or less, but may be more than 10. Further, the second radically polymerizable compound is preferably a radically polymerizable compound having a molecular weight of 200 or more and less than 1,000.

As the second radically polymerizable compound, the following compounds can be exemplified. However, the present invention is not limited to the following exemplary compounds.

Examples of the second radically polymerizable compound include bifunctional (meth)acrylate compounds such as polyethylene glycol 200 di(meth)acrylate, polyethylene glycol 300 di(meth)acrylate, polyethylene glycol 400 di(meth)acrylate, polyethylene glycol 600 di(meth)acrylate, triethylene glycol di(meth)acrylate, epichlorohydrin-modified ethylene glycol di(meth)acrylate (as a commercially available product, for example, DENACOL DA-811 manufactured by NAGASE & CO., LTD.), polypropylene glycol 200 di(meth)acrylate, polypropylene glycol 400 di(meth)acrylate, polypropylene glycol 700 di(meth)acrylate, Ethylene Oxide (EO)•Propylene Oxide (PO) block polyether di(meth) acrylate (as a commercially available product, for example, a BLEMMER PET series manufactured by NOF CORPORATION), dipropylene glycol di(meth)acrylate, bisphenol A EO addition-type di(meth)acrylate (as a commercially available product, for example, M-210 manufactured by TOAGOSEI CO., LTD. or NK ESTER A-BPE-20 manufactured by shin-Nakamura Chemical Co., Ltd.), hydrogenated bisphenol A EO addition-type di(meth)acrylate (for example, NK ESTER A-HPE-4 manufactured by shin-Nakamura Chemical Co., Ltd.), bisphenol A PO-addition type di(meth)acrylate (as a commercially available product, for example, LIGHT ACRYLATE BP-4PA manufactured by KYOEISHA CHEMICAL Co., LTD.), bisphenol A epichlorohydrin addition-type di(meth)acrylate (as a commercially available product, for example, EBECRYL 150 manufactured by Daicel-UCB Company, Ltd.), bisphenol A EO•PO addition-type di(meth)acrylate (as a commercially available product, for example, BP-023-PE manufactured by TOHO Chemical Industry Co., Ltd.), bisphenol F EO addition-type di(meth)acrylate (as a commercially available product, for example, ARONIX M-208 manufactured by TOAGOSEI CO., LTD.), 1,6-hexanediol di(meth)acrylate, 1,6-hexanediol di(meth)acrylate modified with epichlorohydrin, neopentyl glycol di(meth)acrylate, hydroxypivalic acid neopentyl glycol di(meth)acrylate, hydroxypivalic acid neopentyl glycol di(meth)acrylate modified with caprolactone, 1,4-butanediol di(meth)acrylate, 1,9-nonanediol di(meth)acrylate, trimethylolpropane di(meth)acrylate, tricyclodecane dimethanol di(meth)acrylate, pentaerythritol di(meth)acrylate monostearate, trimethylolpropane acrylic acid-benzoic ester, and isocyanuric acid EO-modified di(meth)acrylate (as a commercially available product, for example, ARONIX M-215 manufactured by TOAGOSEI CO., LTD.).

Moreover, examples of the radically polymerizable compound include trifunctional (meth)acrylate compounds such as trimethylolpropane tri(meth)acrylate, trimethylolpropane tri(meth)acrylate modified with EO, PO, or epichlorohydrin, pentaerythritol tri(meth)acrylate, glycerol tri(meth)acrylate, glycerol tri(meth)acrylate modified with EO, PO, or epichlorohydrin, isocyanuric acid EO-modified tri(meth)acrylate (as a commercially available product, for example, ARONIX M-315 manufactured by TOAGOSEI CO., LTD.), tris(meth)acryloyloxyethyl phosphate, (2,2,2-tri-(meth) acryloyloxymethyl)ethyl hydrogen phthalate, glycerol tri (meth)acrylate, and glycerol tri(meth)acrylate modified with EO, PO, or epichlorohydrin; tetrafunctional (meth)acrylate compounds such as pentaerythritol tetra(meth)acrylate, pentaerythritol tetra(meth)acrylate modified with EO, PO, or epichlorohydrin, and ditrimethylolpropane tetra(meth)acrylate; pentafunctional (meth)acrylate compounds such as dipentaerythritol penta(meth)acrylate and dipentaerythritol penta(meth)acrylate modified with EO, PO, epichlorohydrin, fatty acid, or alkyl; and hexafunctional (meth)acrylates such as dipentaerythritol hexa(meth)acrylate, dipentaerythritol hexa(meth)acrylate modified with EO, PO, epichlorohydrin, fatty acid, or alkyl, sorbitol hexa(meth)acrylate, and sorbitol hexa(meth)acrylate modified with EO, PO, epichlorohydrin, fatty acid, or alkyl.

The second radically polymerizable compound may be used in combination of two or more kinds thereof. In this case, a mixture of dipentaerythritol pentaacrylate and dipentaerythritol hexaacrylate, "DPHA" (manufactured by Nippon Kayaku Co., Ltd.), or the like can be preferably used.

Furthermore, as the second radically polymerizable compound, a polyester (meth)acrylate and an epoxy (meth) acrylate, having a weight-average molecular weight of 200 or more and less than 1,000, are also preferable. As commercially available products thereof, examples of the polyester (meth)acrylate include trade name BEAMSET 700 series including, for example, BEAMSET 700 (hexafunctional), BEAMSET 710 (tetrafunctional), and BEAMSET 720 (trifunctional) manufactured by Arakawa Chemical Industries, Ltd., and examples of the epoxy (meth)acrylate include trade name SP series including, for example, SP-1506, 500, SP-1507, and 480 as well as VR series including, for example, VR-77 manufactured by Showa Highpolymer Co., Ltd., and EA-1010/ECA, EA-11020, EA-1025, and EA-6310/ECA (trade name) manufactured by shin-Nakamura Chemical Co., Ltd.

Moreover, specific examples of the second radically polymerizable compound also include the following exemplary compounds A-9 to A-11.

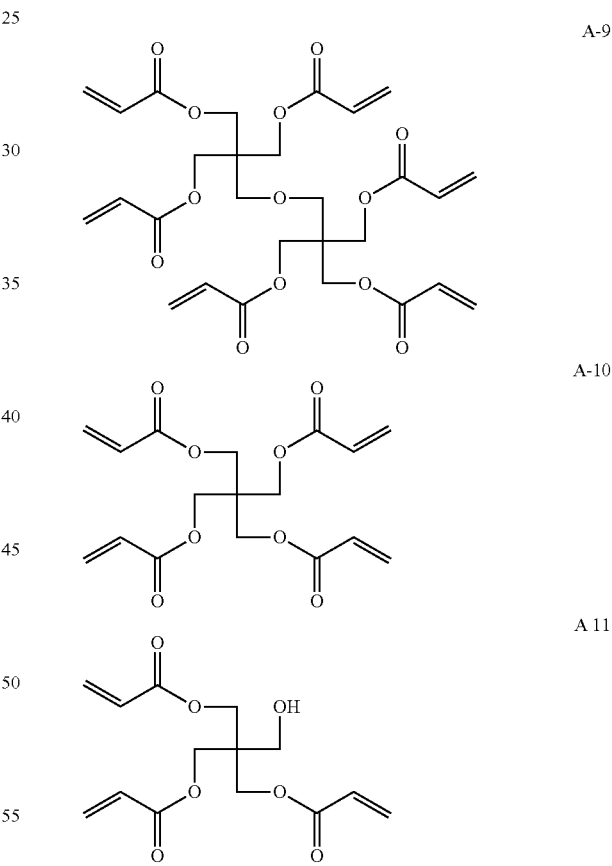

A-9

A-10

A 11

The actinic energy ray-curable composition in the second aspect (2) which is a preferred aspect of the second aspect includes a b) radically polymerizable compound including 3 or more ethylenically unsaturated groups per molecule. The b) compound including 3 or more ethylenically unsaturated groups per molecule is hereinafter described as the "b) component".

Examples of the b) component include an ester of a polyhydric alcohol and a (meth)acrylic acid, vinylbenzene and derivative thereof, vinylsulfone, and (meth)acrylamide. Among these, a radically polymerizable compound including three or more radically polymerizable groups selected from the group consisting of an acryloyl group and a methacryloyl group per molecule is preferable. Specific examples thereof include a compound which is an ester of a polyhydric alcohol and a (meth)acrylic acid, and has three or more ethylenically unsaturated groups per molecule. More specific examples thereof include (di)pentaerythritol tetra (meth)acrylate, (di)pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, (di)pentaerythritol penta(meth)acrylate, dipentaerythritol hexa(meth)acrylate, pentaerythritol hexa(meth)acrylate, 1,2,3-cyclohexanete tetramethacrylate, polyurethane polyacrylate, polyester polyacrylate, caprolactone-modified tris(acryloxyethyl) isocyanurate, tripentaerythritol triacrylate, tripentaerythritol hexatriacrylate, 1,2,4-cyclohexane tetra(meth)acrylate, and pentaglycerol triacrylate. In addition, the "(di)pentaerythritol" is used to mean any of either and both of pentaerythritol and dipentaerythritol.

Furthermore, a resin including three or more radically polymerizable groups selected from the group consisting of an acryloyl group and a methacryloyl group per molecule is also preferable.

Examples of the resin including three or more radically polymerizable groups selected from the group consisting of an acryloyl group and a methacryloyl group per molecule include polymers such as polyfunctional compounds including, for example, a polyester-based resin, a polyether-based resin, an acrylic resin, an epoxy-based resin, a urethane-based resin, an alkyd-based resin, a spiroacetal-based resin, a polybutadiene-based resin, a polythiolpolyene-based resin, and a polyhydric alcohol.

Specific examples of the radically polymerizable compound including three or more radically polymerizable groups selected from the group consisting of an acryloyl group and a methacryloyl group per molecule include the exemplary compounds shown in paragraph 0096 of JP2007-256844A.

Furthermore, specific examples of the radically polymerizable compound including three or more radically polymerizable groups selected from the group consisting of an acryloyl group and a methacryloyl group per molecule include esterified products of polyols and (meth)acrylic acids, such as KAYARAD DPHA, KAYARAD DPI-HA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303, all manufactured by Nippon Kayaku Co., Ltd., and V #400 and V #36095D, both manufactured by Osaka Organic Chemical Industry Ltd. Further, tri- or higher functional urethane acrylate compounds such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by The Nippon Synthetic Chemical Industry Co., Ltd.), UL-503LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K, EB-220, EB-5129, EB-1830, and EB-4358 (manufactured by Daicel UCB), Hi-Corp AU-2010 and Hi-Corp AU-2020 (manufactured by Tookushiki Co., Ltd.), ARONIX M-1960 (manufactured by Toagosei Co., Ltd.), ARTRESIN UN-3320HA, UN-3320HC, UN-3320HS, UN-904, and HDP-4T, and tri- or higher functional polyester compounds such as ARONIX M-8100, M-8030, and M-9050 (manufactured by Toagosei Co., Ltd.), KBM-8307 (a product of Daicel-Cytec Co., Ltd.), or the like can also be suitably used.

In addition, the b) component may be used singly or in combination of two or more kinds thereof having different structures.

As described above, preferably, in a case where the total solid content of the cured layer is 100% by mass, a cured layer formed by curing the actinic energy ray-curable composition in the second aspect (2) can include 15% to 70% by mass of the structure derived from a), 25% to 80% by mass of the structure derived from b), 0.1% to 10% by mass of the structure derived from c), and 0.1% to 10% by mass of the structure derived from d). Further, in a case where the total solid content of the actinic energy ray-curable composition is 100% by mass, the actinic energy ray-curable composition in the second aspect (2) includes the structure derived from b) in the amount of preferably 40% to 75% by mass, and more preferably 60% to 75% by mass. In addition, in a case where the total solid content of the actinic energy ray-curable composition is 100% by mass, the actinic energy ray-curable composition in the second aspect (2) includes the b) component in the amount of preferably 40% to 75% by mass, and more preferably 60% to 75% by mass.

—Cationically Polymerizable Compound—

The actinic energy ray-curable composition in the second aspect includes at least one kind of radically polymerizable compound and at least one kind of cationically polymerizable compound. As the cationically polymerizable compound, any polymerizable compound can be used without limitation as long as it has a polymerizable group capable of undergoing cationic polymerization (a cationically polymerizable group). Further, the number of the cationically polymerizable groups included per molecule is at least 1. The cationically polymerizable compound may be a monofunctional compound including one cationically polymerizable group, or a polyfunctional compound including two or more such groups per molecule. The number of the cationically polymerizable groups included in the polyfunctional compound is not particularly limited, but is preferably 2 to 6 per molecule. Further, two or more cationically polymerizable groups included per molecule of the polyfunctional compound may be the same as or different from each other in the structures.

Moreover, in one aspect, the cationically polymerizable compound preferably has one or more radically polymerizable groups per molecule, together with the cationically polymerizable group. With regard to such the radically polymerizable group which the cationically polymerizable compound has, reference can be made to the above-mentioned description of the radically polymerizable compound. An ethylenically unsaturated group is preferable, and the ethylenically unsaturated group is more preferably a radically polymerizable group selected from the group consisting of a vinyl group, an acryloyl group, and a methacryloyl group. The number of the radically polymerizable groups per molecule of the cationically polymerizable compound having the radically polymerizable group is at least 1, preferably 1 to 3, and more preferably 1.

Preferred examples of the cationically polymerizable group are an oxygen-containing heterocyclic group and a vinyl ether group. Further, the cationically polymerizable compound may include one or more oxygen-containing heterocyclic groups and one or more vinyl ether groups per molecule.

The oxygen-containing heterocycle may be a single ring or a fused ring. Further, the oxygen-containing heterocycle having a bicyclo skeleton is also preferable. The oxygen-containing heterocycle may be a non-aromatic ring or an aromatic ring, with a non-aromatic ring being preferable. Specific examples of the single ring include an epoxy ring, a tetrahydrofuran ring, and an oxetane ring. Further, examples of the compound having a bicyclo skeleton include an oxabicyclo ring. Incidentally, the cationically polymerizable group including the oxygen-containing heterocycle is included in the cationically polymerizable compound as a monovalent substituent or a divalent or higher polyvalent substituent. Further, the fused ring may be a condensate of two or more oxygen-containing heterocycles, or a condensate of one or more oxygen-containing heterocycles and one or more cyclic structures other than oxygen-containing heterocycles. Examples of the cyclic structures other than the oxygen-containing heterocycles include, but are not limited to, cycloalkane rings such as a cyclohexane ring.

Specific examples of the oxygen-containing heterocycle are shown below. However, the present invention is not limited to these following specific examples.

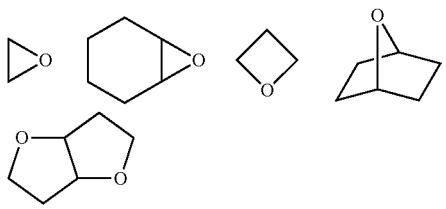

The cationically polymerizable compound may include a partial structure other than the cationically polymerizable group. Such the partial structure is not particularly limited, and may be a linear structure, a branched structure, or a cyclic structure. These partial structures may include one or more heteroatoms such as an oxygen atom and a nitrogen atom.

As a preferred aspect of the cationically polymerizable compound, a compound including a cyclic structure (cyclic structure-containing compound) as the cationically polymerizable group or a partial structure other than the cationically polymerizable group can be exemplified. For example, one, or two or more cyclic structures may be included in the cyclic structure-containing compound per molecule. The number of the cyclic structures included in the cyclic structure-containing compound per molecule is, for example, 1 to 5, but is not particularly limited. A compound including two or more cyclic structures per molecule may include the same cyclic structures or two or more different cyclic structures having different structures.

As an example of the cyclic structure included in the cyclic structure-containing compound, an oxygen-containing heterocycle can be exemplified. The details thereof are as set forth above.

The cationically polymerizable group equivalent (=B/C) which is obtained by dividing the molecular weight (hereinafter described as "B") by the number of the cationically polymerizable groups (hereinafter described as "C") included per molecule of the cationically polymerizable compound is, for example, 300 or less. From the viewpoint of improving the adhesiveness between the cured layer formed by curing the actinic energy ray-curable composition and the resin film, the cationically polymerizable group equivalent is preferably less than 150. On the other hand, from the viewpoint of the hygroscopicity of the cured layer formed by curing the actinic energy ray-curable composition, the cationically polymerizable group equivalent is preferably 50 or more. Further, in one aspect, the cationically polymerizable group included in the cationically polymerizable compound, based on which the cationically polymerizable group equivalent is calculated, can be an epoxy group (epoxy ring). That is, in one aspect, the cationically polymerizable compound is an epoxy ring-containing compound. From the viewpoint of forming a cured layer formed by curing the actinic energy ray-curable composition having good adhesiveness to the resin film, the epoxy group equivalent as calculated by dividing the molecular weight by the number of the epoxy rings included per molecule of the epoxy ring-containing compound is preferably less than 150. The epoxy group equivalent of the epoxy ring-containing compound is, for example, 50 or more.

Furthermore, the molecular weight of the cationically polymerizable compound is preferably 500 or less, and preferably 300 or less. The present inventors presume that a cationically polymerizable compound having a molecular weight within a range tends to easily penetrate into a resin film, and thus, can contribute to improving the adhesiveness between the cured layer formed by curing the actinic energy ray-curable composition and the resin film.

The actinic energy ray-curable composition in the second aspect (2) includes a) a cationically polymerizable compound which includes an alicyclic epoxy group and an ethylenically unsaturated group, has one alicyclic epoxy group included per molecule, has one ethylenically unsaturated group included per molecule, and has a molecular weight of 300 or less. Hereinafter, the a) above is described as an "a) component".

Examples of the ethylenically unsaturated group include radically polymerizable groups including an acryloyl group, a methacryloyl group, a vinyl group, a styryl group, an allyl group, or the like. Among these, an acryloyl group, a methacryloyl group, and $C(O)OCH=CH_2$ are preferable, and an acryloyl group and a methacryloyl group are more preferable. The numbers of the alicyclic epoxy groups and the ethylenically unsaturated groups per molecule are each preferably 1.

The molecular weight of the a) component is 300 or less, preferably 210 or less, and more preferably 200 or less.

In a preferred aspect of the a) component, a compound represented by General Formula (1) can be exemplified.

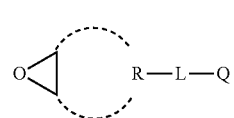

(1)

In General Formula (1), R represents a monocyclic hydrocarbon or a crosslinked hydrocarbon, L represents a single bond or a divalent linking group, and Q represents an ethylenically unsaturated group.

In a case where R in General Formula (1) is a monocyclic hydrocarbon, it is preferably an alicyclic hydrocarbon, more preferably an alicyclic group having 4 to 10 carbon atoms, still more preferably an alicyclic group having 5 to 7 carbon atoms, and particularly preferably an alicyclic group having 6 carbon atoms. Specific examples thereof include a cyclobutyl group, a cyclopentyl group, a cyclohexyl group, and a cycloheptyl group, and particularly preferably a cyclohexyl group. Specific preferred examples thereof include a cyclobutyl group, a cyclopentyl group, a cyclohexyl group, and a cycloheptyl group, with a cyclohexyl group being more preferable.

In a case where R in General Formula (1) is a crosslinked hydrocarbon, the crosslinked hydrocarbon is preferably a bicyclic crosslinked hydrocarbon (bicyclo ring) or a tricyclic crosslinked hydrocarbon (tricyclo ring). Specific examples thereof include crosslinked hydrocarbons having 5 to 20 carbon atoms, such as a norbornyl group, a bornyl group, an isobornyl group, a tricyclodecyl group, a dicyclopentenyl group, a dicyclopentanyl group, a tricyclopentenyl group, a tricyclopentanyl group, an adamantly group, and an adamantyl group substituted with a low alkyl group (for example, an alkyl group having 1 to 6 carbon atoms).

In a case where L represents a divalent linking group, the divalent linking group is preferably a divalent aliphatic hydrocarbon group. The number of carbon atoms of the divalent aliphatic hydrocarbon group is preferably in a range of 1 to 6, more preferably in a range of 1 to 3, and still more preferably 1. The divalent aliphatic hydrocarbon group is preferably a linear, branched, or cyclic alkylene group, more preferably a linear or branched alkylene group, and still more preferably a linear alkylene group.

Examples of Q include ethylenically unsaturated groups such as an acryloyl group, a methacryloyl group, a vinyl group, a styryl group, and an allyl group. Among these, an acryloyl group, a methacryloyl group, and —C(O)OCH=CH$_2$ are preferable, and an acryloyl group and a methacryloyl group are more preferable.

Specific examples of the a) component include the various compounds exemplified in paragraph 0015 of JP1998-17614A (JP10-17614A), the compound represented by General Formula (1A) or (1B), and 1,2-epoxy-4-vinylcyclohexane. Among those, the compound represented by General Formula (1A) or (1B) is more preferable. Further, an isomer of the compound represented by General Formula (1A) is also preferable.

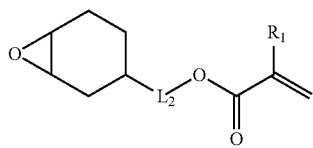

(1A)

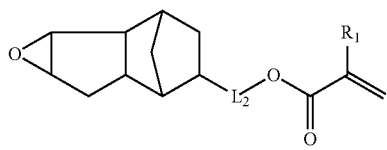

(1B)

In General Formulae (1A) and (1B), R$_1$ represents a hydrogen atom or a methyl group, L$_2$ represents a divalent aliphatic hydrocarbon group having 1 to 6 carbon atoms.

The divalent aliphatic hydrocarbon group represented by L$_2$ in each of General Formulae (1A) and (1B) has 1 to 6 carbon atoms, more preferably 1 to 3 carbon atoms, and still more preferably 1 carbon atom. The divalent aliphatic hydrocarbon group is preferably a linear, branched, or cyclic alkylene group, more preferably a linear or branched alkylene group, and still more preferably a linear alkylene group.

Preferably, in a case where the total solid content of the cured layer is 100% by mass, the cured layer formed by curing the actinic energy ray-curable composition in the second aspect (2) includes the structure derived from a) in the amount of preferably 15% to 70% by mass, more preferably 18% to 50% by mass, and still more preferably 22% to 40% by mass. Further, in a case where the total solid content of the actinic energy ray-curable composition is 100% by mass, the actinic energy ray-curable composition in the second aspect (2) includes the a) component in the amount of preferably 15% to 70% by mass, more preferably 18% to 50% by mass, and still more preferably 22% to 40% by mass.

A nitrogen-containing heterocycle is another example of a cyclic structure contained in the above cyclic structure-containing compound. A nitrogen-containing heterocycle-containing compound is a preferable cationically polymerizable compound from the viewpoint of forming a cured layer formed by curing the actinic energy ray-curable composition having good adhesiveness to the resin film in the hard coat film. A compound having one or more nitrogen-containing heterocycles selected from the group consisting of isocyanurate rings (the nitrogen-containing heterocycles contained in exemplary compounds B-1 to B-3 farther below) and glycoluril rings (the nitrogen-containing heterocycles contained in exemplary compound B-10 farther below) per molecule is preferable as a nitrogen-containing heterocycle-containing compound. Among these, a compound containing an isocyanurate ring (an isocyanurate ring-containing compound) is preferred as a cationically polymerizable compound from the viewpoint of forming a cured layer formed by curing the actinic energy ray-curable composition with good adhesion to the resin film in the hard coat film. This is presumed by the present inventors to be due to the good affinity of isocyanurate rings for the resin constituting the resin film. From this viewpoint, a resin film containing an acrylic resin film is preferable. It is still more preferable for the surface in direct contact with the cured layer formed by curing the actinic energy ray-curable composition to be the surface of an acrylic resin film.

Further, as another example of a cyclic structure included in the cyclic structure-containing compound, an alicyclic structure can be exemplified. Examples of the alicyclic structure include cyclo ring, bicyclo ring, and tricyclo ring structures. Specific examples thereof include a dicyclopentanyl ring and a cyclohexane ring.

The cationically polymerizable compound described above can be synthesized by a known method. It is also available as a commercially available product.

Specific examples of the cationically polymerizable compound including an oxygen-containing heterocycle as a cationically polymerizable group include 3,4-epoxycyclohexylmethyl methacrylate (commercially products such as CYCLOMER M100 manufactured by Daicel Chemical Industries, Ltd.), 3,4-epoxycyclohexylmethyl-3',4'-epoxycyclohexane carboxylates (for example, commercially available products such as UVR6105 and UVR6110 manufactured by Union Carbide Co., Ltd., and CELLOXIDE 2021 manufactured by Daicel Co., Ltd. UCB), bis(3,4-epoxycyclohexylmethyl)adipate (for example, UVR6128 manufactured by Union Carbide Co., Ltd.), vinylcyclohexene monoepoxide (for example, CELLOXIDE 2000 manufactured by Daicel Co., Ltd.), ε-caprolactone-modified 3,4-epoxycyclohexylmethyl-3',4'-epoxycyclohexane carboxylate (for example, CELLOXIDE 2081 manufactured by Daicel Co., Ltd.), 1-methyl-4-(2-methyloxylanyl)-7-oxabi-cyclo[4,1,0]heptane (for example, CELLOXIDE 3000 manufactured by Daicel Co., Ltd.), 7,7'-dioxa-3,3'-bi[bicyclo[4.1.0]heptane] (for example, CELLOXIDE 8000 manufactured by Daicel Co., Ltd.), 3-ethyl-3-hydroxymethyloxetane, 1,4bis-{[(3-ethyl-3-oxetanyl)methoxy]methyl}benzene, 3-ethyl-3-(phenoxymethyl)oxetane, 3-ethyl-3-(2-ethylhexyoxymethyl)oxetane, and di[1-ethyl(3-oxetanyl)]methyl ether.

Moreover, specific examples of the cationically polymerizable compound including a vinyl ether group as the cationically polymerizable group include 1,4-butanediol divinyl ether, 1,6-hexanediol divinyl ether, nonanediol divinyl ether, cyclohexanediol divinyl ether, cyclohexane dimethanol divinyl ether, triethylene glycol divinyl ether, trimethylol propane trivinyl ether, and pentaerythritol tetravinyl ether. As the cationically polymerizable compound having a vinyl ether group, a cationically polymerizable compound having an alicyclic structure is also preferable.

Furthermore, as the cationically polymerizable compound, the compounds exemplified in JP1996-143806A (JP-H08-143806A), JP1996-283320A (JP-H08-283320A), JP2000-186079A, JP2000-327672A, JP2004-315778A, JP2005-29632A, and the like can also be used.

Exemplary compounds B-1 to B-14 are shown below as specific examples of the cationically polymerizable compound, but the present invention is not limited to the following specific examples.

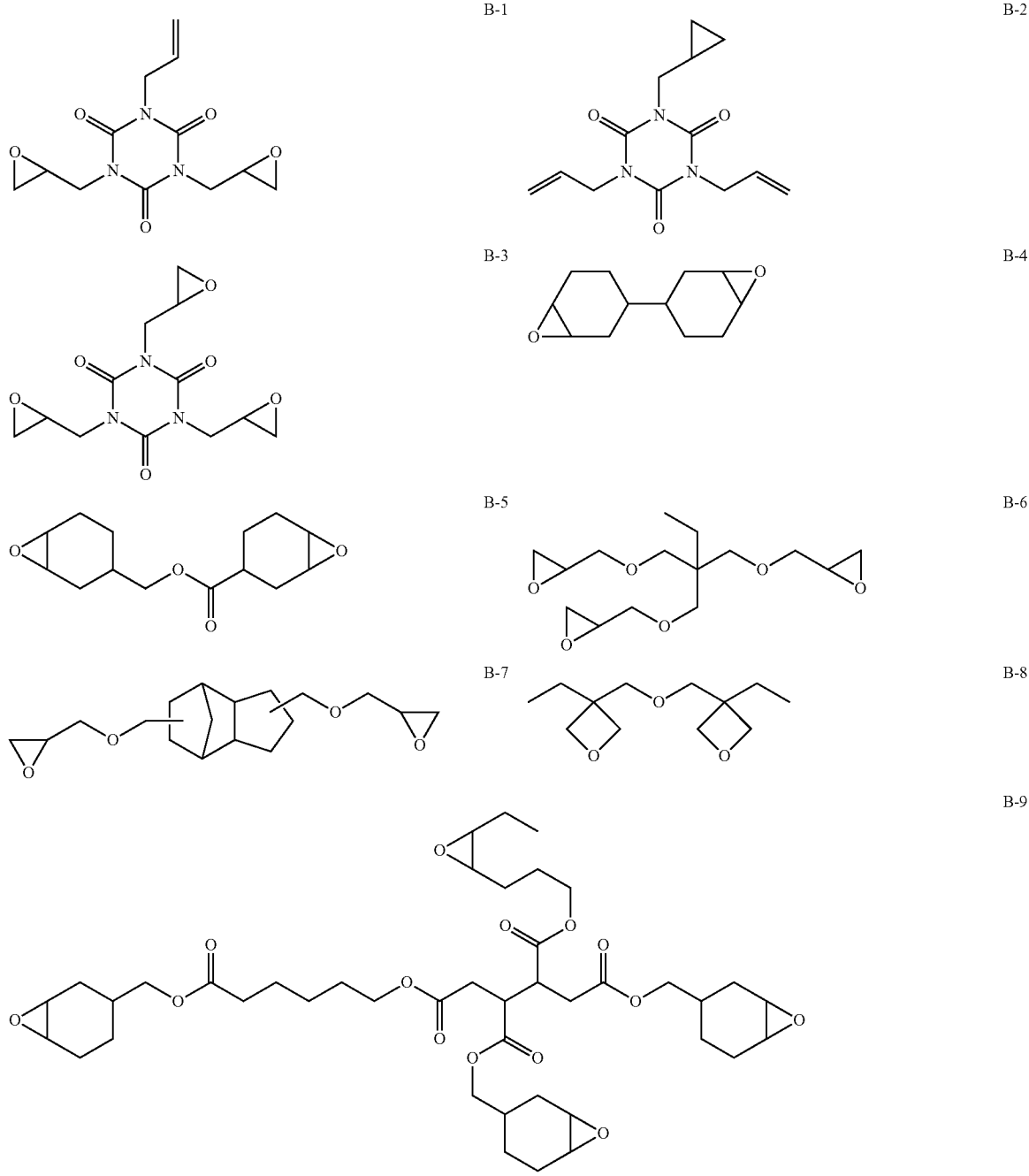

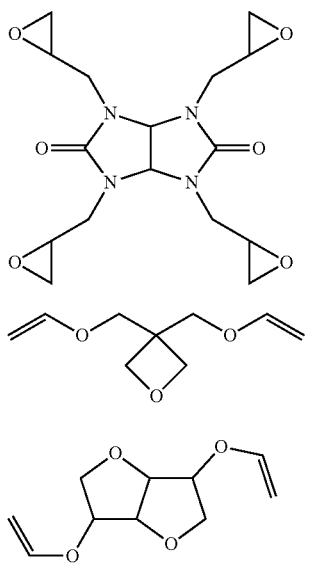

B-10

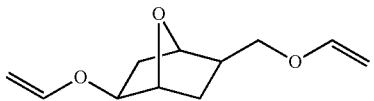

B-11

B-12

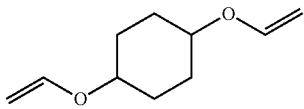

B-13

B-14

Furthermore, from the viewpoint of improving the adhesiveness between the cured layer formed by curing the actinic energy ray-curable composition and the resin film, preferred aspects of the actinic energy ray-curable composition include the following aspects. The actinic energy ray-curable composition more preferably satisfies one or more of the following aspects, still more preferably satisfies two or more of the following aspects, even still more preferably satisfies three or more of the following aspects, and far more preferably satisfies all of the following aspects. In addition, one cationically polymerizable compound satisfies a plurality of the aspects. For example, a nitrogen-containing heterocycle-containing compound having a cationically polymerizable group equivalent of less than 150, and the like can be exemplified as a preferred aspect.

(1) Including a nitrogen-containing heterocycle-containing compound as a cationically polymerizable compound. The nitrogen-containing heterocycle which the nitrogen-containing heterocycle-containing compound has is preferably selected from the group consisting of an isocyanurate ring and a glycoluril ring. The nitrogen-containing heterocycle-containing compound is preferably an isocyanurate ring-containing compound. More preferably, the isocyanurate ring-containing compound is an epoxy group-containing compound including one or more epoxy rings per molecule.

(2) Including a cationically polymerizable compound having a cationically polymerizable group equivalent of less than 150 as a cationically polymerizable compound. Preferably including an epoxy group-containing compound having an epoxy equivalent of less than 150.

(3) Including a functional group having an ethylenically unsaturated group as a cationically polymerizable compound.

(4) Including an oxetane ring-containing compound including one or more oxetane rings per molecule, together with another cationically polymerizable compound, as a cationically polymerizable compound. The oxetane ring-containing compound is preferably a compound having no nitrogen-containing heterocycle.

The content of the cationically polymerizable compound in the actinic energy ray-curable composition is preferably 10 parts by mass or more, more preferably 15 parts by mass or more, and still more preferably 20 parts by mass or more, with respect to 100 parts by mass of the total content of the radically polymerizable compound and the cationically polymerizable compound. Further, the content of the cationically polymerizable compound in the actinic energy ray-curable composition is preferably 50 parts by mass or less with respect to 100 parts by mass of the total content of the radically polymerizable compound and the cationically polymerizable compound.

Moreover, the content of the cationically polymerizable compound in the actinic energy ray-curable composition is preferably 0.05 parts by mass or more, more preferably 0.1 parts by mass or more, and still more preferably 1 part by mass or more, with respect to 100 parts by mass of the total content of the content of first radically polymerizable compound and the cationically polymerizable compound. On the other hand, the content of the cationically polymerizable compound is preferably 50 parts by mass or less, more preferably 40 parts by mass or less, with respect to 100 parts by mass of the total content of the content of the first radically polymerizable compound and the cationically polymerizable compound.

In addition, in the present invention and the present specification, a compound having both a cationically polymerizable group and a radically polymerizable group is classified as a cationically polymerizable compound, and its content in the actinic energy ray-curable composition is specified.

—Polymerization Initiator—

The actinic energy ray-curable composition preferably includes a polymerizable compound, and more preferably includes a photopolymerization initiator. The actinic energy ray-curable composition including a radically polymerizable compound preferably includes a radical photopolymerization initiator, and the actinic energy ray-curable composition including a cationically polymerizable compound preferably includes a radical photopolymerization initiator, and also preferably includes a cationic photopolymerization initiator.

Further, the radical photopolymerization initiator may be used singly or in combination of two or more kinds having different structures. This shall apply to a cationic photopolymerization initiator.

Hereinafter, the respective photopolymerization initiators will be sequentially described.

(i) Radical Photopolymerization Initiator

Any known radical photopolymerization initiator can be employed without any limitation as long as it can generate radicals as active species upon irradiation with light. Specific examples thereof include acetophenones such as diethoxyacetophenone, 2-hydroxy-2-methyl-1-phenylpropan-1-one, benzyldimethylketal, 4-(2-hydroxyethoxy)phenyl(2-hydroxy-2-propyl)ketone, 1-hydroxycyclohexylphenylketone, 2-methyl-2-morpholino(4-thiomethylphenyl) propan-1-one, 2-benzyl-2-dimethylamino-1-(4-morpholinophenyl)butanone, 2-hydroxy-2-methyl-1-[4-(1-methylvinyl)phenyl]propanone oligomers, and 2-hydroxy-1-({4-[4-(2-hydroxy-2-methylpropionyl)hexyl]phenyl}-2-methylpropan-1-one; oxime esters such as 1,2-octanedione, 1-[4-(phenylthio)-2-(O-benzoyloxime)], ethanone, and 1-[9-ethyl-6-(2-methylbenzoyl)-9H-carbazol-3-yl]-1-(O-acetyloxime); benzoins such as benzoin, benzoinmethyl ether, benzoinethyl ether, benzoinisopropyl ether, and benzoinisobutyl ether; benzophenones such as benzophenone, octyl-benzoylmethyl benzoate, 4-phenylbenzophenone, 4-benzoyl-4'-methyldiphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzenemetanamiumbromide, and (4-benzoylbenzyl)trimethylammoniumchloride; thioxanthones such as 2-isopropylthioxanthone, 4-isopropylthioxanthone, 2,4-diethylthioxanthone, 2,4-dichlorothioxanthone, 1-chloro-4-propxythioxanthone, and 2-(3-dimethylamino-2-hydroxy)-3,4-dimethyl-9H-thoxanthon-9-one methochloride; and acylphosphineoxides such as 2,4,6-trimethylbenzoyldiphenylphosphineoxide, bis(2,6-dimethoxybenzoyl)-2,4,4-trimethylpentylphosphineoxide, and bis(2,4,6-trimethylbenzoyl)phenylphosphineoxide. Further, triethanolamine, triisopropanolamine, 4,4'-dimethylaminobenzophenone (Michler's ketone), 4,4'-diethylaminobenzophenone, 2-dimethylaminoethyl benzoate, ethyl 4-dimethylaminobenzoate, (n-butoxy)ethyl 4-dimethylaminobenzoate, isoamyl 4-dimethylaminobenzobenzoate, 2-ethylhexyl 4-dimethylaminobenzoate, 2,4-diethylthioxanthone, 2,4-diisopropylthioxanthone, and the like may be used in combination as a radical photopolymerization initiator adjuvant.

The afore-mentioned radical photopolymerization initiators and adjuvants can be synthesized by known methods, or are also available as commercially available products. Preferred examples of the commercially available radical photopolymerization initiator include IRGACURE (127, 651, 184, 819, 907, 1870 (CGI-403/Irg184=7/3 mixed initiators, 500, 369, 1173, 2959, 4265, 4263, and the like), OXE01), and the like manufactured by BASF; KAYACURE (DETX-S, BP-100, BDMK, CTX, BMS, 2-EAQ, ABQ, CPTX, EPD, ITX, QTX, BTC, MCA, and the like) manufactured by Nippon Kayaku Co., Ltd., and ESACURE (KIP100F, KB1, EB3, BP, X33, KT046, KT37, KIP150, TZT), and the like manufactured by Sartomer Co., Inc.

The content of the radical photopolymerization initiator in the actinic energy ray-curable composition can be suitably adjusted within a range allowing the polymerization reaction (radical polymerization) of the radically polymerizable compound to progress smoothly, and is not particularly limited. By way of example, the content of the radical photopolymerization initiator is in a range of 0.1 to 20 parts by mass, preferably in a range of 0.5 to 10 parts by mass, and preferably in a range of 1 to 10 parts by mass, with respect to 100 parts by mass of the radically polymerizable compound included in the actinic energy ray-curable composition.

(ii) Cationic Photopolymerization Initiator

As the cationic photopolymerization initiator, a compound which can generate a cation as an active species by light irradiation is preferable, and known cationic photopolymerization initiators can be used without limitation. Specific examples thereof include a sulfonium salt, an ammonium salt, an iodonium salt (for example, a diaryl iodonium salt), a triaryl sulfonium salt, a diazonium salt, an iminium salt, and the like that are known. More specifically, examples thereof include the cationic photopolymerization initiators represented by Formulae (25) to (28) shown in paragraphs 0050 to 0053 in JP1996-143806A (JP-H08-143806A), the compounds exemplified as cationic polymerization catalysts in paragraph 0020 of JP1996-283320A (JP-H08-283320A), and the like. The cationic photopolymerization initiator can be synthesized by a known method, or can be obtained as a commercially available product. As the commercially available product, CI-1370, CI-2064, CI-2397, CI-2624, CI-2639, CI-2734, CI-2758, CI-2823, CI-2855, CI-5102, and the like manufactured by NIPPON SODA CO., LTD., PHOTOINITIATOR 2047 and the like manufactured by Rhodia, UVI-6974 and UVI-6990 manufactured by Union Carbide Corporation), or CPI-10P manufactured by San-Apro Ltd. can be used.

In view of the sensitivity of the photopolymerization initiator with respect to light, the stability of a compound, and the like, a diazonium salt, an iodonium salt, a sulfonium salt, or an iminium salt is preferable as the cationic photopolymerization initiator. In addition, in view of weather fastness, an iodonium salt is the most preferable.

Specific examples of commercially available products of the iodonium salt-based cationic photopolymerization initiator include B2380 manufactured by Tokyo Chemical Industry Co., Ltd., BBI-102 manufactured by Midori Kagaku Co., Ltd., WPI-113 manufactured by Wako Pure Chemical Industries, Ltd., WPI-124 manufactured by Wako Pure Chemical Industries, Ltd., WPI-169 manufactured by Wako Pure Chemical Industries, Ltd., WPI-170 manufactured by Wako Pure Chemical Industries, Ltd., and DTBPI-PFBS manufactured by Toyo Gosei Co., Ltd.

Moreover, specific examples of the iodonium salt compound which can be used as the cationic photopolymerization initiator include the following compounds PAG-1 and PAG-2.

Cationic Photopolymerization Initiator (Iodonium Salt Compound) PAG-1

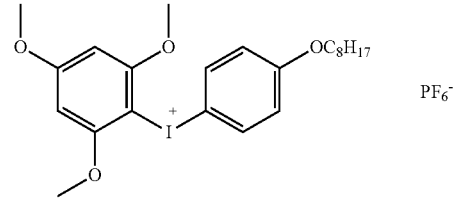

Cationic Photopolymerization Initiator (Iodonium Salt Compound) PAG-2

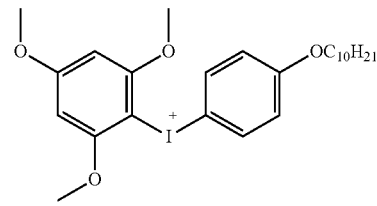

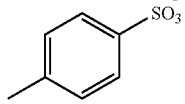

The content of the cationic photopolymerization initiator in the actinic energy ray-curable composition can be suitably adjusted to within a range allowing the polymerization reaction (cationic polymerization) of the cationically polymerizable compound to proceed smoothly and is not particularly limited. For example, the content of the cationic photopolymerization initiator is a range of 0.1 to 200 parts by mass, preferably in a range of 1 to 150 parts by mass, and more preferably in a range of 2 to 100 parts by mass, with respect to 100 parts by mass of the cationically polymerizable compound.

Examples of the other photopolymerization initiator include the photopolymerization initiators described in paragraphs 0052 to 0055 of JP2009-204725A, and the contents of the publication are incorporated herein.

—Component which May be Optionally Included in Actinic Energy Ray-Curable Composition—

The actinic energy ray-curable composition includes at least one kind of component having a property of being cured by irradiation with actinic energy rays, and can optionally include at least one kind of polymerization initiator, with preferably including the polymerization initiator. The details thereof are as set forth above.

Next, various components which can be optionally included in the actinic energy ray-curable composition will be described.

(i) Inorganic Particles

The actinic energy ray-curable composition can include inorganic particles having an average primary particle diameter of less than 2 µm. From the viewpoint of improving the hardness of a front-surface plate having the cured layer formed by curing the actinic energy ray-curable composition (in addition, improving the hardness of a liquid crystal panel having a front-surface plate), it is preferable that the actinic energy ray-curable composition and a cured layer formed by curing the composition preferably includes inorganic particles having an average primary particle diameter of less than 2 µm. The average primary particle diameter of the inorganic particles is preferably in a range of 10 nm to 1 µm, more preferably in a range of 10 nm to 100 nm, and still more preferably in a range of 10 nm to 50 nm.

With regard to the average primary particle diameter of the inorganic particles and matte particles which will be described later, particle observation is performed with a transmission electron microscope (magnification of 500,000 to 2,000,000 times) with 100 randomly selected particles (primary particles), and the average value of the particle diameters is defined as an average primary particle diameter.

Examples of the inorganic particles include silica particles, titanium dioxide particles, zirconium oxide particles, and aluminum oxide particles. Among these, silica particles are preferable.

The inorganic particles are preferably treated on their surfaces with a surface modifier including an organic segment in order to increase affinity between the inorganic particles and the organic components included in the actinic energy ray-curable composition. The surface modifier preferably has a functional group forming a bond with inorganic particles or absorbable to inorganic particles and a functional group having high affinity with organic components in a molecule. The surface modifier having a functional group bonded with or absorbable to inorganic particles is preferably a silane-based surface modifier, a metal alkoxide surface modifier such as aluminum, titanium, and zirconium, or a surface modifier having an anionic group such as a phosphoric acid group, a sulfate group, a sulfonic acid group, and a carboxylic acid group. Examples of the functional group having high affinity with the organic component include a hydrophilic-hydrophobic functional group such as organic components, and a functional group capable of chemically bonding with organic components. Among those, a functional group capable of chemically bonding with organic components, or the like is preferable, and an ethylenically unsaturated group or an open-ring polymerizable group is more preferable.

The preferred inorganic particle surface modifier is a metal alkoxide surface modifier or a polymerizable compound having an anionic group and an ethylenically unsaturated group or ring-opened polymerizable group in the same molecule. By forming a chemical bond with the inorganic particle and the organic components by these surface modifiers, the crosslinking density of a cured layer can be increased, and as a result, the hardness of the front-surface plate (further, the hardness of the liquid crystal panel including the front-surface plate) can be improved.

Specific examples of the surface modifier include the following exemplary compounds S-1 to S-8.

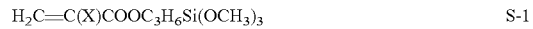  S-1

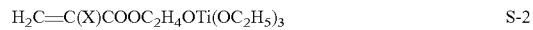  S-2

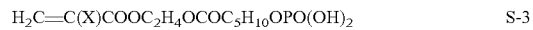  S-3

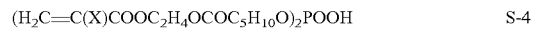  S-4

  S-5

  S-6

  S-7

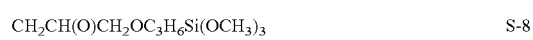  S-8

(X represents a hydrogen atom or a methyl group)

The inorganic particles using the surface modifier are preferably subjected to surface modification in a solution. In a case where the inorganic particles are mechanically dispersed, they may be dispersed together with a surface modifier, or the inorganic particles may be first mechanically dispersed and then, after the addition of a surface modifier, stirred, or the inorganic particles may be subjected to surface modification before being mechanically dispersed (warming, heating after drying, or power of hydrogen (pH) adjustment is carried out, as desired), and then dispersed. As a solvent in which the surface modifier is dissolved, an organic solvent having high polarity is preferable. Specific examples thereof include known solvents such as an alcohol, a ketone, and an ester.

In a case where the total solid content of the actinic energy ray-curable composition is 100% by mass, the content of the inorganic particles is preferably 5% to 40% by mass, and more preferably 10% to 30% by mass. The shapes of primary particles of the inorganic particles are not limited to spherical or non-spherical shapes, but the primary particles of the inorganic particles are preferably spherical. It is preferable that the particles are present as non-spherical high-dimensional particles such as secondary or higher particles to which 2 to 10 spherical inorganic fine particles (primary particles) in the cured layer formed by curing the actinic energy ray-curable composition are linked is preferable from the viewpoint of further improving hardness.

Specific examples of inorganic fine particles may include ELECOM V-8802 (spherical silica fine particles having an average primary particle diameter of 15 nm, manufactured by Nikki Kabushiki Kaisha) or ELECOM V-8803 (non-spherical silica fine particles manufactured by Nikki Kabushiki Kaisha), MiBK-SD (spherical silica fine particles having an average primary particle diameter of 10 nm to 20 nm, manufactured by Nissan Chemical), MEK-AC-2140Z (spherical silica fine particles having an average primary particle diameter of 10 nm to 20 nm, manufactured by Nissan Chemical), MEK-AC-4130 (spherical silica fine particles having an average primary particle diameter of 45 nm, manufactured by Nissan Chemical), MiBK-SD-L (spherical silica fine particles having an average primary particle diameter of 40 nm to 50 m, manufactured by Nissan Chemical) and MEK-AC-5140Z (spherical silica fine particles having an average primary particle diameter of 85 nm, manufactured by Nissan Chemical). Among these, ELECOM V-8802 manufactured by Nikki Kabushiki Kaisha is preferable from the viewpoint of further improving the hardness.

(ii) Matte Particles

The actinic energy ray-curable composition can also include matte particles. The matte particles refer to particles having an average primary particle diameter of 2 μm or more, and they may be either inorganic particles or organic particles, or may be particles of inorganic-organic composite materials. The shapes of the matte particles are not limited to spherical or non-spherical. The average primary particle diameter of the matte particles is preferably in a range of 2 to 20 μm, more preferably in a range of 4 to 14 μm, and still more preferably in a range of 6 to 10 μm.

Specific examples of the matte particles include o inorganic particles such as silica particles and $TiO_2$ particles, and organic particles such as crosslinked acryl particles, crosslinked acryl-styrene particles, crosslinked styrene particles, melamine resin particles, and benzoguanamine resin particles. Among these, the matte particles are preferably organic particles, and more preferably crosslinked acryl particles, crosslinked acryl-styrene particles, or crosslinked styrene particles.

The matte particles have a content in terms of a unit volume in the cured layer formed by curing the actinic energy ray-curable composition of preferably 0.10 $g/cm^3$ or more, more preferably 0.10 $g/cm^3$ to 0.40 $g/cm^3$, and still more preferably 0.10 $g/cm^3$ to 0.30 $g/cm^3$.

(iii) Polyrotaxane

The actinic energy ray-curable composition may include a polyrotaxane. From the viewpoint of improving the hardness of a front-surface plate having a cured layer formed by curing the actinic energy ray-curable composition, it is preferable that the actinic energy ray-curable composition includes the polyrotaxane. The "polyrotaxane" is a molecular assembly having a structure in which linear molecules are threaded through the openings of cyclic molecules (which can be a structure in which linear molecules are threaded through the openings of cyclic molecules in the form of a skewer shape, or a structure in which linear molecules are clathrated in cyclic molecules), and blocking groups are usually present at both terminals of the linear molecules in order to prevent dissociation of the cyclic molecules. The details of the blocking groups will be described later.

From the viewpoint of further improving the hardness of the front-surface plate, the weight-average molecular weight of the polyrotaxane is preferably 1,000,000 or less, more preferably 600,000 or less, and still more preferably in a range of 600,000 to 180,000.

The linear molecule included in the polyrotaxane is not particularly limited as long as it is linear. Further, in the present invention, the "linear molecule" is not limited in terms of the molecular weight and may be a multimer. Further, the "linear molecule" included in the polyrotaxane only needs to be a substantially linear molecule. Here, being substantially linear means that the linear chain molecule may have a branched chain to such an extent that the rotating, sliding, and moving of a cyclic molecule are not interfered. The linear molecule is preferably a linear molecule which can be integrated with a cyclic molecule through a non-covalent bond in the polyrotaxane.

Examples of the linear molecule included in the polyrotaxane include hydrophilic polymers such as polyvinyl alcohol, polyvinylpyrrolidone, poly(meth)acrylic acid, cellulose resins (carboxymethyl cellulose, hydroxyethyl cellulose, hydroxypropyl cellulose, and the like), polyacrylamide, polyethylene oxide, polyethylene glycol, polyvinyl acetal resin, polyvinyl methyl ether, polyamine, polyethylenimine, casein, gelatin, starch and/or copolymers thereof, and the like; and hydrophobic polymers, for example, polyolefin resins such as polyethylene, polypropylene, and other copolymer resins with olefin monomers, polyester resins, polyvinyl chloride resins, polystyrene resins such as polystyrene and acrylonitrile-styrene copolymer resins, acrylic resins such as polymethyl methacrylate, (meth)acrylic ester copolymers, and acrylonitrile-methyl acrylate copolymer resins, polycarbonate resins, polyurethane resins, vinyl chloride-vinyl acetate copolymer resins, and polyvinyl butyral resins; and derivatives or modified forms thereof. In addition, in the present specification the "polymer" has the same definition as the polymer. The polymer will be as set forth above.

Specific preferred examples of the hydrophilic polymer include polyethylene glycol, polypropylene glycol, a copolymer of polyethylene glycol and polypropylene glycol, polyisoprene, polyisobutylene, polybutadiene, polytetrahydrofuran, polydimethylsiloxane, polyethylene, and polypropylene. Polyethylene glycol and a copolymer of polyethylene glycol and polypropylene glycol are more preferable, and polyethylene glycol is still more preferable.

The molecular weight of the linear molecule included in the polyrotaxane is preferably 1,000 or more (for example, 1,000 to 1,000,000), preferably 5,000 or more (for example, 5,000 to 1,000,000 or 5,000 to 500,000), and more preferably 10,000 or more (for example, 10,000 to 1,000,000, 10,000 to 500,000, or 10,000 to 300,000).

The linear molecule for use in the synthesis of the polyrotaxane preferably has a reactive group at both terminals thereof. Presence of the reactive group can facilitate the reaction with blocking groups to introduce the blocking groups into both the terminal of the linear molecule. Example of the reactive group include, but are not limited to, a hydroxyl group, an amino group, a carboxyl group, and a thiol group, and the terminal may be selected from the reactive groups which can undergo a reaction with blocking groups to be used.

As the cyclic molecule included in the polyrotaxane, any cyclic molecule which can be threaded through the opening of linear molecule is available.

Furthermore, the "cyclic molecule" included in the polyrotaxane refers to a molecule which is substantially cyclic. The "being substantially cyclic" means a ring which is not completely closed as in an alphabetical character "C" and also encompasses an overlapping spiral structure of the shape of the alphabetical character "C", one terminal of which is not bonded to the other terminal. This is the same as either or both of the two rings contained in the "bicyclo molecule" which will be described later.

Examples of the cyclic molecule included in the polyrotaxane include various cyclodextrins (for example, α-cyclodextrin, β-cyclodextrin, γ-cyclodextrin, dimethyl cyclodextrin, and glucosyl cyclodextrin, derivatives or modified forms thereof), crown ethers, benzo-crowns, dibenzo-crowns, and dicyclohexano-crowns, and derivatives or modified forms thereof.

In the cyclodextrins, crown ethers, or the like, the openings of the cyclic molecules have different sizes depending on their type. Accordingly, the cyclic molecule to be used can be selected depending on the type of the linear molecule to be used, more specifically assuming that the linear molecule to be used has a cylindrical shape, depending on the diameter of the cross-section of the cylinder or on whether the linear molecule is hydrophobic or hydrophilic. In a case where cyclic molecules each having a relatively large opening and a cylindrical linear molecule having a relatively small diameter are used, two or more linear molecules can also be threaded through the openings of the cyclic molecules.

As the cyclic molecule, α-cyclodextrin is preferable.

In a case where the cyclic molecule is cyclodextrin, the number (sliding amount) of the cyclic molecules to which the linear molecules are slided into is preferably 0.05 to 0.60, more preferably 0.10 to 0.50, and still more preferably 0.20 to 0.40, assuming that a maximum sliding amount (the maximum amount of the linear molecule capable of being slided (based on the number of molecules)) is 1.

The cyclic molecules included in the polyrotaxane preferably have reactive groups at the outside of the rings. The cyclic molecules may be bonded or crosslinked to each other by the reactive groups through a crosslinking agent. Although depending on the crosslinking agent and the like to be used, examples of the reactive groups include a hydroxyl group, an amino group, a carboxyl group, a thiol group, and an aldehyde group. In addition, as the reactive group, a group (or a group with insufficient reactivity) which does not react with a blocking group to be introduced in a reaction for introducing the blocking group into the linear molecule is preferable.

In one aspect, from the viewpoint of further improving the hardness of the front-surface plate, it is preferable that the polyrotaxane includes an unsaturated group, and it is more preferable that the polyrotaxane includes an unsaturated double bond group. The position at which the polyrotaxane has an unsaturated group is not particularly limited, but the unsaturated bond group can be introduced into for example, a cyclic molecule. By introduction of the group, it is possible to perform a polymerization with a polymerizable compound having an ethylenically unsaturated group.

The introduction of an unsaturated group into the polyrotaxane can be performed by the substitution of at least some of cyclic molecules having hydroxyl groups (—OH), such as cyclodextrin, with an unsaturated group, and preferably an unsaturated double bond group.

Examples of the unsaturated double bond group include, but are not limited to, an olefinyl group, an acryloyl group, a methacryloyl group, a vinyl ether group, and a styryl group. From the viewpoint of further improving the hardness of the front-surface plate, unsaturated group introduced into the polyrotaxane is preferably a methacryloyl group.

A method for introducing the unsaturated group to the polyrotaxane is not particularly limited. Specific examples thereof including the following exemplified methods. That is, the examples include a method by formation of a carbamate bond by an isocyanate compound and the like, a method by formation of an ester bond by a carboxylic acid compound, an acid chloride compound, an acid anhydride, and the like, a method by formation of a silyl ether bond by a silane compound and the like, and a method by formation of a carbonate bond by a chlorocarbonic acid compound and the like.

In a case where a (meth)acryloyl group as the unsaturated group is introduced through a carbamoyl bond, the introduction is carried out by dissolving a polyrotaxane in a dehydration solvent such as dimethyl sulfoxide and dimethyl formamide, and adding a (meth)acryloylating agent having an isocyanate group. Alternatively, in a case of carrying out introduction through an ether bond or an ester bond, a (meth)acryloylating agent having an active group, such as a glycidyl group and an acid chloride can also be used.

For example, a step (substitution step) of substituting a hydroxyl group contained in the cyclic molecule with an unsaturated group may be performed before, during, or after the step of preparing a polyrotaxane. Further, the substitution step may be performed before, during, or after the step of introducing block groups in the pseudopolyrotaxane to prepare the polyrotaxane. In addition, in a case where the polyrotaxane is one having a reactive group in each cyclic molecule, the substitution step may be carried out before, during, or after the step of reacting the polyrotaxane molecules with each other. The substitution step may also be performed in these two or more periods. The substitution step is preferably performed after the preparation of the polyrotaxane through introduction of the block groups in the pseudopolyrotaxane but before reacting the polyrotaxane molecules with each other. The conditions that may be used in the substitution step depend on the unsaturated group with which the hydroxyl group is to be substituted, but are not particularly limited and various reaction methods and reaction conditions can be used.

The block group which is present at both terminals of the linear molecule included in the polyrotaxane may any group which can maintain a structure where the linear molecule is threaded into the opening of the cyclic molecule. Examples of the block group include dinitrophenyl groups such as a 2,4-dinitrophenyl group and a 3,5-dinitrophenyl group, cyclodextrins, adamantane groups, trityl groups, fluoresceins, pyrenes, and derivatives or modified forms thereof. It is preferable that a polyrotaxane including an α-cyclodextrin as the cyclic molecule and polyethylene glycol as the linear molecule includes cyclodextrins, dinitrophenyl groups such as a 2,4-dinitrophenyl group and a 3,5-dinitrophenyl group, adamantane groups, trityl groups, fluoresceins, pyrenes, and derivatives or modified forms thereof as a block group.

The polyrotaxane may be a crosslinked polyrotaxane. The crosslinked polyrotaxane refers to a compound including two or more polyrotaxanes, in which these polyrotaxanes are linked through chemical bonds between the cyclic molecules. The structures of the two or more polyrotaxanes included in the crosslinked polyrotaxane may be the same as or different from each other. The chemical bond may be a single bond, and may be a bond through various atoms or molecules.

Furthermore, the polyrotaxane may be a molecule in which the cyclic molecule has a crosslinked ring structure, that is, a "bicyclo molecule" having a first ring and a second ring. In this case, for example, a crosslinked polyrotaxane can be obtained by mixing a "bicyclo molecule" and a linear molecule to thread a linear molecule into either or both opening of the first ring and the second ring in the "bicyclo molecule".

Moreover, the polyrotaxane may be a polyrotaxane which has been subjected to various modification treatments. As an example thereof, a polyrotaxane which has been subjected to a hydrophobitization modification treatment (hydrophobitization-modified polyrotaxane) can be exemplified. In a case where the cyclic molecules included in the polyrotaxane are cyclodextrins such as an α-cyclodextrin, it is possible to obtain a hydrophobitization-modified polyrotaxane by substituting at least one of the hydroxyl groups of the cyclodextrin with other organic group (a hydrophobic group).

Specific examples of the hydrophobic group include, but are not limited to, an alkyl group, a benzyl group, a benzene derivative-containing group, an acyl group, a silyl group, a trityl group, a nitric ester group, a tosyl group, an alkyl-substituted ethylenically unsaturated group as the photocurable site, and an alkyl-substituted epoxy group. Further, the hydrophobitization-modified polyrotaxane may have one or more hydrophobic groups, or two or more hydrophobic groups having different structures in combination.

The degree of modification of the hydrophobitization-modified polyrotaxane, which has been subjected to a hydrophobitization modification treatment with a hydrophobic group is, taking the total number of the hydroxyl groups contained in the cyclodextrin as 1, preferably 0.02 or more (1 or less), more preferably 0.04 or more, and still more preferably 0.06 or more, by way of an example of a case where the cyclic molecule included in the polyrotaxane to be subjected to a hydrophobitization modification treatment is a cyclodextrin. The degree of modification is a ratio of the number of the modified hydroxyl groups to the total number of the above-described hydroxyl groups.

The above-described various polyrotaxanes are available as commercially available products or can be prepared by the above-described methods or by known methods other than the above-described methods. As the commercially available polyrotaxanes, SeRM SUPER POLYMER SH3400P, SH2400P, SH1310P, SM3405P, SM1315P, SA3405P, SA2405P, SA1315P, SH3400C, SA3400C, SA2400C, or the like, manufactured by Advanced Soft Materials Inc., can be preferably used.

The content of the polyrotaxane is preferably 1% to 40% by mass, more preferably 10% to 30% by mass, and still more preferably 15% to 25% by mass, with respect to the solid content in the cured layer formed by curing the actinic energy ray-curable composition (iv) Other Components The actinic energy ray-curable composition can include arbitrary amounts of one or more known additives, in addition to the components. Examples of the additives include a surface conditioner, a leveling agent, a polymerization inhibitor, and an antistatic agent. With regard to the details, reference can be made to, for example, paragraphs 0032 to 0034 of JP2012-229412A. Further, the actinic energy ray-curable composition can also include a commercially available antifouling agent or an antifouling agent which can be prepared by a known method. However, the additives are not limited thereto, and various additives which can be added generally to the actinic energy ray-curable composition can be used. In addition, the actinic energy ray-curable composition can also include arbitrary amounts of known solvents.

The actinic energy ray-curable composition can be prepared by mixing the above-described various components simultaneously or sequentially in arbitrary order. The preparation method is not particularly limited, and known stirrers or the like can be used for the preparation.

—Thickness of Cured Layer Formed by Curing Actinic Energy Ray-Curable Composition, and Method for Forming Such Cured Layer—

The thickness of the cured layer formed by curing the actinic energy ray-curable composition is, for example, in a range of 20 to 180 µm, and from the viewpoint of improving the hardness of a front-surface plate including the layer (in addition, improving the hardness of a liquid crystal panel including the front-surface plate), the thickness is preferably in a range of 20 to 30 µm. The thickness of the cured layer can be adjusted by the amount of the actinic energy ray-curable composition to be applied.

The actinic energy ray-curable composition can be applied onto a resin film directly or through another layer such as an easily adhesive layer, and irradiated with actinic energy rays to form a cured layer. The application can be carried out by a known coating method such as a dip coating method, an air knife coating method, a curtain coating method, a roller coating method, a die coating method, a wire coating method, and a gravure coating method. The cured layer can be formed as a cured layer having a laminate structure with two or more layers (for example, about two to five layers) by simultaneously or sequentially applying two or more compositions with different compositional ratios.

By irradiating the applied actinic energy ray-curable composition with actinic energy rays, a cured layer can be formed. For example, in a case where the actinic energy ray-curable composition includes a radically polymerizable compound, a cationically polymerizable compound, a radical photopolymerization initiator, and a cationic photopolymerization initiator, a polymerization reaction of the radically polymerizable compound and the cationically polymerizable compound can proceed by initiation of the action of each of a radical photopolymerization initiator and a cationic photopolymerization initiator. The wavelength of light to be irradiated may be determined depending on the types of the polymerizable compound and the polymerization initiator to be used. Examples of the light source for light irradiation include a high-pressure mercury lamp which emits light in a wavelength range of 150 to 450 nm, an ultrahigh-pressure mercury lamp, a carbon arc lamp, a metal halide lamp, a xenon lamp, a chemical lamp, an electrodeless discharge lamp, and a light emitting diode (LED). Further, the amount of light to be irradiated is usually in a range of 30 to 3,000 mJ/cm$^2$, and preferably in a range of 100 to 1,500 mJ/cm$^2$. As desired, a drying treatment may be performed before and after the light irradiation or before or after the light irradiation. The drying treatment can be carried out by blowing hot air, disposing the layer in a heating furnace, transporting the layer in a heating furnace, or the like. In a case where the actinic energy ray-curable composition includes a solvent, the heating temperature needs only to be set to a temperature at which the solvent can be dried and removed, and is not particularly limited. Here, the heating temperature refers to the temperature of a hot air or the atmospheric temperature in a heating furnace.

(Easily Adhesive Layer)

As described above, the front-surface plate can include an easily adhesive layer which is a layer capable of playing a role in improving the adhesive force between the front-surface plate and the adhesive layer. As the easily adhesive layer, an easily adhesive layer including an adhesive or pressure-sensitive adhesive having a known composition can be used. Hereinafter, the specific aspects of the easily adhesive layer will be described, but the easily adhesive layer included in the front-surface plate is not limited to the following specific aspects. In addition, the front-surface plate may not have an easily adhesive layer.

—Thermally Crosslinkable Compound—

The easily adhesive layer can be a cured layer formed by curing a thermosetting composition including a thermally crosslinkable compound in one aspect. The thermally crosslinkable compound refers to a compound having one or more functional groups (thermally crosslinkable groups) which can cause a crosslinking reaction by heating, per molecule, and is preferably a polyfunctional compound having two or more thermally crosslinkable groups per molecule. Hereinafter, the thermally crosslinkable compound will also be described as a crosslinking agent. By forming a crosslinked structure by the crosslinking agent, and preferably by forming a crosslinked structure between the resins which will be described later, the cured layer can be formed.

As the crosslinking agent, it is preferable to use an isocyanate-based compound (hereinafter also referred to as an isocyanate-based crosslinking agent). From the viewpoint of improving the adhesiveness with respect to the resin film, it is preferable to use the isocyanate-based crosslinking agent. In consideration of application of the isocyanate-based crosslinking agent to in-line coating or the like, it is preferable that the crosslinking agent has water solubility or water dispersibility.

The isocyanate-based compound is a compound derived from an isocyanate derivative represented by an isocyanate or a blocked isocyanate. Examples of the isocyanate include an aromatic isocyanate such as tolylene diisocyanate, xylylene diisocyanate, methylene biphenyl diisocyanate, phenylene diisocyanate, or naphthalene diisocyanate, an aromatic ring-containing aliphatic isocyanate such as α,α,α',α'-tetramethylxylylene diisocyanate, an aliphatic isocyanate such as methylene diisocyanate, propylene diisocyanate, lysine diisocyanate, trimethyl hexamethylene diisocyanate, or hexamethylene diisocyanate, and an alicyclic isocyanate such as cyclohexane diisocyanate, methyl cyclohexane diisocyanate, isophorone diisocyanate, methylene bis(4-cyclohexylisocyanate), or isopropylidene dicyclohexyl diisocyanate. Examples of the isocyanate also include a biuretized isocyanate, an isocyanurated isocyanate, a uretdionized isocyanate, and polymers or derivatives of an isocyanate modified with carbodiimide. These may be used singly or in combination of a plurality of kinds thereof having different structures. Among the isocyanate-based compounds, from the viewpoint of avoiding yellowing caused by ultraviolet rays, an aliphatic isocyanate or an alicyclic isocyanate is more preferable than an aromatic isocyanate.

From the viewpoint of the pot life of the thermosetting composition, it is preferable that the isocyanate-based compound is used in the state of a blocked isocyanate. Examples of blocking agents for making the blocked isocyanate include bisulfites, a phenol-based compound such as phenol, cresol, and ethyl phenol, an alcohol-based compound such as propylene glycol monomethyl ether, ethylene glycol, benzyl alcohol, methanol, and ethanol, an active methylene-based compound such as dimethyl malonate, diethyl malonate, methyl acetoacetate, ethyl acetoacetate, or acetyl acetone, a mercaptan-based compound such as butyl mercaptan and dodecyl mercaptan, a lactam-based compound such as ε-caprolactam and δ-valerolactam, an amine-based compound such as diisopropylamine, diphenylaniline, aniline, and ethylenimine, acetanilide, an acid amide compound of amide acetate, and formaldehyde, an oxime-based compound such as acetaldoxime, acetone oxime, methyl ethyl ketone oxime, and cyclohexanone oxime, and a pyrazole-based compound such as dimethyl pyrazol and 1,2,4-triazole, and these may be used singly or in combination of two or more kinds thereof having different structures.

As the blocking agent, it is preferable to use a malonic acid diester derivative of an active methylene-based compound. As the amine-based compound, linear secondary amines are preferable, and among these, diisopropylamine, diisobutylamine, di(2-butylamine), and di(t-butyl)amine are more preferable. It is more preferable to use the active methylene-based compound and the amine-based compound in combination. Particularly, it is preferable to use a blocking agent formed of diethyl malonate and diisopropylamine.

The isocyanate-based compounds may be used singly or in combination of two or more kinds having different structures. Incidentally, they may be used as a product obtained by mixing or bonding the isocyanate-based compound with or to various resins. In order to improve the dispersibility or crosslinking properties of the isocyanate-based compound, it is preferable to use a product obtained by mixing or bonding the isocyanate-based compound with or to a polyester-based resin or a polyurethane-based resin.

In addition to the isocyanate-based crosslinking agent, for example, a crosslinking agent selected from the group consisting of a melamine-based compound, an epoxy-based compound, an oxazoline-based compound, a carbodiimide-based compound, or the like may be mixed in and used. Generally, in the easily adhesive layer, the crosslinking agent is contained in the crosslinking agent in the form of a compound that has partially or totally undergone a crosslinking reaction. Furthermore, in some cases, a resin is also included in the crosslinking agent, in a state where at least a part thereof is crosslinked with the crosslinking agent.

From the viewpoint of controlling the modulus of elasticity of the front-surface plate, the proportion of the crosslinking agent in the thermosetting composition is, for example, 0.10% to 30.00% by mass, preferably 0.50% to 25.00% by mass, and more preferably 2.00% to 20.00% by mass, with respect to the total amount of the solid content of the thermosetting composition.

—Resin—

The easily adhesive layer preferably includes a resin. From the viewpoint of the adhesiveness with respect to the resin film, the proportion of the resin in the easily adhesive layer is preferably 30% to 90% by mass, more preferably 40% to 85% by mass, and still more preferably 50% to 80% by mass, with respect to the total mass of the easily adhesive layer. The resin can function as a binder, and the type of the resin is not particularly limited. It is preferable that the resin is at least one of an acrylic resin, a polyester-based resin, a polyurethane-based resin, a polystyrene-based resin, or a styrene-butadiene copolymer. Taking into consideration the environment, the resin is preferably soluble or dispersible in water.

As an example of the resin which is preferable as a binder, a polyvinyl alcohol-based resin can be exemplified. The polyvinyl alcohol-based resin is synthesized using an acid component as a raw material. The acid component is a dicarboxylic acid such as maleic acid, fumaric acid, and itaconic acid or a monoester thereof, a monocarboxylic acid such as acrylic acid, methacrylic acid, and crotonic acid, or the like, and may include a carboxyl group on a side chain thereof. As the acid component, a dicarboxylic acid, maleic acid, and itaconic acid which easily form a crosslinkage by an acid are preferable, and maleic acid and itaconic acid are more preferable.

The degree of saponification of the polyvinyl alcohol-based resin is not particularly limited, but is preferably 50% to 95% by mole, more preferably 60% to 90% by mole, and still more preferably 70% to 90% by mole.

Incidentally, the degree of carboxylic acid modification is not particularly limited, but is preferably 0.5% to 10% by mole, and more preferably 2% to 5% by mole.

In addition, the degree of polymerization is not particularly limited, but is preferably from 300 to 3,000, more preferably from 400 to 2,000, and still more preferably from 500 to 2,000. The higher the degree of polymerization is, the further the cohesive force of the easily adhesive layer can be improved, and the further the modulus of elasticity of the front-surface plate can be increased. From the viewpoint of the viscosity of the thermosetting composition, the degree of polymerization is preferably 2,000 or less. In addition, by mixing resins with different degrees of polymerization together, it is possible to adjust the viscosity of the thermosetting composition while improving the cohesive force of the easily adhesive layer.

Moreover, the degree of saponification and the degree of polymerization described in the present specification are values measured according to JIS K 6726 1994.

—Other Components—

Moreover, the thermosetting composition for use in the formation of the easily adhesive layer can include one or more kinds of known additives, as desired. Examples of such the additives include an anti-foaming agent, a coatability-improving agent, a thickener, an organic lubricant, an antistatic agent, an ultraviolet absorbent, an antioxidant, a foaming agent, a dye, and a pigment.

Furthermore, the thermosetting composition may include a catalyst, a surfactant, a dispersant, a thickener, a film-forming aid, an anti-blocking agent, or the like, as desired. Examples of the catalyst include an organic tin-based compound (for example, ERASTRON Cat•21 manufactured by DKS Co., Ltd). Examples of the surfactant include an anionic surfactant, a sulfosuccinic acid-based surfactant, a polyethylene oxide-based surfactant (for example, NAROACTY CL-95 manufactured by Sanyo Chemical Industries, Ltd.), and the like. The compositional analysis for the easily adhesive layer can be performed by, for example, obliquely cutting the easily adhesive layer by using a Surface And Interfacial Cutting Analysis System (SAICAS) (registered trademark, manufactured by DAYPLA WINTES CO., LTD.) and performing surface analysis such as Time-of-Flight Secondary Ion Mass Spectrometry (TOF-SIMS) on the cutting surface.

For the purpose of improving blocking properties and lubricating properties of the easily adhesive layer, the easily adhesive layer may contain particles. Examples of the particles include inorganic particles such as silica, alumina, and other metal oxides, organic particles such as crosslinked polymer particles of a polymethyl methacrylate resin (PMMA) or polystyrene, and the like. Specifically, examples of the particles include silica sol containing colloidal silica particles having an average particle diameter of 30 nm to 300 nm. The average particle diameter refers to a volume-average particle diameter and is a value measured by laser analysis/scattering-type particle diameter distribution analysis. As a device for measuring the average particle diameter, it is possible to use a laser analysis/scattering-type particle diameter distribution analyzer LA950 [manufactured by HORIBA, Ltd.]. The average particle diameter shown in Examples which will be described later is a value measured by this device.

As an example of a method for controlling the modulus of elasticity of the front-surface plate, adjustment of a compositional ratio of the composition for forming an easily adhesive layer can be exemplified. The modulus of elasticity of the front-surface plate tends to be increased by using, for example, a resin having a great molecular weight and decreased by using a resin having a small molecular weight. Furthermore, the modulus of elasticity of the easily adhesive layer tends to be increased by increasing the amount of the crosslinking agent and decreased by reducing the amount of the crosslinking agent. Regarding the particles, the modulus of elasticity of the easily adhesive layer tends to be increased by increasing the amount of the particles and decreased by reducing the amount of the particles. By appropriately setting the constituent components of the easily adhesive layer or the mixing ratio in consideration of the above-mentioned points, the modulus of elasticity of the front-surface plate can be adjusted.

—Thickness of Easily Adhesive Layer and Method for Forming Such Layer—

The thickness of the easily adhesive layer is, for example, in a range of 10 to 1,000 nm, and preferably in a range of 80 to 200 nm. The thickness of the easily adhesive layer can be adjusted by the production conditions, for example, the amount of the composition to be applied for forming the layer.

The composition for forming the easily adhesive layer can be applied to a coating surface such as a resin film surface, by a known coating method such as a reverse gravure coating method, a direct gravure coating method, a roll coating method, a reverse roll method, a die coating method, a bar coating method, and a curtain coating method. With regard to the coating method, reference can be made to, for example, "Coating Method" (Maki Shoten, Yuji Harazaki, published in 1979). The coating surface may be subjected to a surface treatment such as a saponification treatment, a corona discharge treatment, and a plasma treatment before coating.

(Sensor Film)

The front-surface plate can also include a sensor film on the side of the front-side polarizing plate on the front side of the resin film of the front-surface plate. The sensor film may be bonded with, for example, the surface of the resin film on the front-side polarizing plate side. As the sensor film, any sensor film known as a film-type touch sensor can be used without limitation. As an example of the sensor film, for example, those described in JP2012-206307A can be exemplified.

(Decorative Layer)

In the front-surface plate of the liquid crystal display device, a decorative layer may be provided in the outer peripheral portion or the like in some cases for the purpose of concealing wiring so as to prevent the wiring from being visually recognized, decoration, or the like. The liquid crystal panel may include a decorative layer on the front-surface plate. The decorative layer can be formed by printing a composition for forming a decorative layer onto a part of a printing surface by a known printing method, for example. Further, the decorative layer is not limited to formation by a printing method, and it may be formed by, for example, applying a composition for forming a decorative layer by a known coating method. Alternatively, by a known method such as lithography, and exposure and development, a decorative layer in a desired shape may be formed. The thickness of the decorative layer is not particularly limited, but is generally approximately 0.5 to 40 μm. In view of transmittance, in a case where the decorative layer is black, the thickness is preferably set to 0.5 to 10 μm, and in a case where the decorative layer is white, the thickness is preferably set to 10 to 40 μm. Further, the decorative layer may be a layer having a laminated structure with two or more layers. As the layer included in the layers constituting the laminated structure, a metal-containing layer can be exemplified which is formed of a metal material by a vacuum deposition method, a sputtering method, an ion plating method, or a plating method. By providing the metal-containing layer, it is possible to form a decorative layer having a metallic luster. The metal material may be selected according to the desired color of the metal luster. For example, it is possible to use a metal such as aluminum, nickel, gold, platinum, chrome steel, copper, tin, indium, silver, titanium, lead, and zinc, and an alloy or compound thereof. The thickness of the metal-containing layer is generally set to about 0.05 μm, but the present invention is not limited thereto.

The decorative layer can be provided in a portion (for example, an outer peripheral portion) of any one surface of the resin film, for example. In one aspect, the decorative layer can be provided on the front-side polarizing plate side of the resin film, for example, between the resin film and the easily adhesive layer.

<<Modulus of Elasticity ECp, Humidity Dimensional Change Rate εCp, and Thickness dCp of Front-Surface Plate>>

As described above, the front-surface plate includes at least a resin film, and may optionally include one or more other layers such as an actinic energy ray-curable layer and an easily adhesive layer. The modulus of elasticity ECp, the dimensional change rate εCp, and the thickness dCp of the front-surface plate only need to satisfy Formula A-1 in the relationship of the modulus of elasticity, the dimensional change rate, and the thickness of the front-side polarizing plate and the rear-side polarizing plate included in the front-surface plate as well as the together liquid crystal panel, and the stress relaxation rate P of the adhesive layer. From the viewpoints of reducing the display unevenness in a high-humidity environment and improving the hardness of the front-surface plate (in addition, improving the hardness of the liquid crystal panel including the front-surface plate), the modulus of elasticity Ecp of the front-surface plate is preferably in a range of 3.5 to 9.0 GPa, and more preferably in a range of 4.5 to 9.0 GPa. Further, from the same viewpoint, the humidity dimensional change rate ECp of the front-surface plate is preferably in a range of 0.15% to 0.70%, and more preferably in a range of 0.15% to 0.50%. From the same viewpoint, the thickness dCp of the front-surface plate is preferably in a range of 120 to 400 μm, and more preferably in a range of 120 to 330 μm.

The thickness dCp of the front-surface plate may be adjusted through the thickness of a film or layer included in the front-surface plate, such as a resin film.

The modulus of elasticity Ecp of the front-surface plate can be adjusted through the modulus of elasticity of a film or layer included in the front-surface plate, such as a resin film. For example, the modulus of elasticity of the resin film can vary depending on the type of resins constituting the resin film, and generally, the modulus of elasticity tends to be increase by increasing the molecular weight or the crystallinity of the resin. Incidentally, the resin film can increase the modulus of elasticity in the stretching direction by stretching. On the other hand, the modulus of elasticity of the actinic energy ray-curable layer which can be optionally included in the front-surface plate tends to be increased by, for example, decreasing a reactive group equivalent (a value obtained by subtracting the molecular weight of a compound from the total number of the reactive groups included in the compound) of a compound having a reactive group, included in the actinic energy ray-curable composition, improving the polymerization rate of the actinic energy ray-curable layer, adding a high-elasticity material (for example, inorganic particles) to an actinic energy ray-curable composition, adding a compound including a rigid molecular structure (for example, an adamantane skeleton), and other like. In addition, adjustment of the modulus of elasticity of the easily adhesive layer is as set forth above.

The humidity dimensional change rate εCp of the front-surface plate can be adjusted through the humidity dimensional change rate of a film or layer included in the front-surface plate, such as a resin film. The humidity dimensional change rate of the resin film can vary depending on the type of resins constituting the resin film, and generally, the dimensional change rate of the resin film can be increased by enhancing the hydrophilicity of the resin (improving a hydroxyl group equivalent (a value obtained by subtracting the molecular weight of a resin from the total number of the hydroxyl groups included in the compound), or the like). Further, the resin film tends to have an increased humidity dimensional change rate in the direction perpendicular to the stretching direction by the stretching. On the other hand, the humidity dimensional change rate of the actinic energy ray-curable layer can be increased by the addition of an actinic energy ray-curable component including a hydroxyl group, the addition of an actinic energy ray-curable component containing an epoxy group, or the like.

<Adhesive Layer>
(Thickness and Stress Relaxation Rate P)

The liquid crystal panel has an adhesive layer having a thickness of 2 μm or more, between the above-described front-surface plate and a front-side polarizing plate, details of which will be described later. With the liquid crystal panel which has an adhesive layer with a thickness of 2 μm or more and satisfies Formula A-1, occurrence of display unevenness in a high-humidity environment can be suppressed. The thickness of the adhesive layer is, for example, in a range of 2 to 120 μm, and from the viewpoint of improving the hardness of the liquid crystal panel, it is preferably in a range of 2 to 90 μm, more preferably in a range of 2 to 50 μm, still more preferably in a range of 2 to 30 μm, and particularly preferably in a range of 5 to 20 μm. The thickness of the adhesive layer can be adjusted by the conditions for producing the adhesive layer.

The stress relaxation rate P of the adhesive layer only needs to satisfy Formula A-1 in the relationship of the modulus of elasticity, the humidity dimensional change rate, and the thickness of the front-surface plate, the front-side polarizing plate, and the rear-side polarizing plate. The stress relaxation rate P of the adhesive layer is, for example, in a range of 15% to 85%, from the viewpoint of improving the hardness of the liquid crystal panel, it is more preferably in a range of 20% to 80%. The stress relaxation rate of the adhesive layer can be increased by decreasing the crosslinking rate of the adhesive layer. Further, addition of a plasticizer, a urethane polymer, liquid paraffin, or the like to a pressure-sensitive adhesive for use in an adhesive layer, reduction in the molecular weight of components included in the pressure-sensitive adhesive, or the like can enhance the stress relaxation rate of the adhesive layer.

As described above, the adhesive layer may be formed using a pressure-sensitive adhesive, or may be formed using an adhesive. Hereinafter, in specific aspects, an adhesive layer including an acrylic pressure-sensitive adhesive will be described, but the present invention is not limited to the following specific aspects.

(Specific Aspects of Adhesive Layer)

As an example of the acrylic pressure-sensitive adhesive, an acrylic pressure-sensitive adhesive which includes at least a (meth)acrylic ester polymer A having a weight-average molecular weight of 500,000 to 3,000,000, or includes a component formed by crosslinking the (meth) acrylic ester polymer A with a (meth)acrylic ester polymer B having a weight-average molecular weight of 8,000 to 300,000 can be exemplified. By increasing the proportion of the (meth)acrylic ester polymer B having a smaller weight-average molecular weight out of the (meth)acrylic ester polymer A and the (meth)acrylic ester polymer B, the stress relaxation rate of the adhesive layer can be increased, whereas by the decreasing the proportion, the stress relaxation rate of the adhesive layer can be decreased. In the component, with 100 parts by mass of the (meth)acrylic ester polymer A, the proportion of the (meth)acrylic ester polymer B is preferably in a range of 5 to 50 parts by mass, and more preferably in a range of 10 to 30 parts by mass.

For details of the (meth)acrylic ester polymer A and the (meth)acrylic ester polymer B included in the component, reference can be made to paragraphs 0020 to 0046 of JP2012-214545A. Further, details of a crosslinking agent for crosslinking the polymers, reference can be made to paragraphs 0049 to 0058 of JP2012-214545A.

The acrylic pressure-sensitive adhesive may include, but preferably includes, a silane coupling agent. For details of the silane coupling agent, reference can be made to paragraphs 0059 to 0061 of JP2012-214545A. In addition, for details of a method for preparing the acrylic pressure-sensitive adhesive, and additives or solvents which can optionally be included, reference can be made to paragraphs 0062 to 0071 of JP2012-214545A.

In one aspect, the acrylic pressure-sensitive adhesive forms an adhesive sheet including the pressure-sensitive adhesive, and can be transferred from the adhesive sheet to the surface of the constitutive members (the front-side polarizing plate or the front-surface plate) of the liquid crystal panel. For details of such the adhesive sheet, reference can be made to paragraphs 0080 to 0097, and FIGS. 1 and 2 of JP2012-214545A.

(Other Components)

The adhesive layer can also optionally include one or more kinds of other components such as known additives. As an example of such the components which may be included optionally, an ultraviolet absorbent, an antistatic agent, and the like can be exemplified.

<Front-Side Polarizing Plate and Rear-Side Polarizing Plate>

<<Modulus of Elasticity Ef, Er, Humidity Dimensional Change Rate εf, εr, Thickness df, and dr>>

In the liquid crystal panel, the front-surface plate and the front-side polarizing plate, each described above, are in a state where they are bonded with each other through the above-mentioned adhesive layer. Further, such the front-side polarizing plate and rear-side polarizing plate are in a state where they are integrally laminated through a liquid crystal display element. The modulus of elasticity Ef, Er, the humidity dimensional change rate εf, εr, the thickness df, and dr of these polarizing plates are, for example, as follows. The modulus of elasticity Ef of the front-side polarizing plate can be in a range of 2.0 to 7.0 GPa. The humidity dimensional change rate εf of the front-side polarizing plate can be in a range of 0.20% to 0.40%. The thickness df of the front-side polarizing plate df can be in a range of 12 to 80 μm. The modulus of elasticity Er of the rear-side polarizing plate can be in a range of 4.0 to 13.0 GPa. The humidity dimensional change rate εf of the rear-side polarizing plate can be in a range of 0.15% to 0.35%. The thickness df of the rear-side polarizing plate can be in a range of 12 to 100 μm. Here, the modulus of elasticity Ef, Er, the humidity dimensional change rate εf, εr, the thickness df, and dr only need to satisfy Formula A-1 in the relationship of the modulus of elasticity, the dimensional change rate, the thickness of the front-surface plate, and the stress relaxation rate P of the adhesive layer, and the present invention is not limited to a range.

Furthermore, generally, in the liquid crystal panel, the front-side polarizing plate and the rear-side polarizing plate are arranged with a liquid crystal display element therebetween in a crossed nicols arrangement such that the absorption axes are perpendicular to each other (usually arranged such that the absorption axis of the rear-side polarizing plate matches the longitudinal direction of the liquid crystal panel). The polarizer layer and the polarizing plate-protecting film, which constitute the polarizing plate, are generally provided with anisotropy in order to express a polarizing function, and therefore, in the crossed nicols arrangement, the front-side polarizing plate and the rear-side polarizing plate in the liquid crystal panel are usually different in the modulus of elasticity and the humidity dimensional change rate in any direction. Thus, in one aspect, the front-side polarizing plate and the rear-side polarizing plate may satisfy Formula A-2 in some cases.

$$3.5 > (Er \times dr \times \varepsilon r)/(Ef \times df \times \varepsilon f) > 1.0 \quad \text{Formula A-2:}$$

The present inventors have presumed that Formula A-2 indicates that the stress of the rear-side polarizing plate is larger than that of the front-side polarizing plate in a high-humidity environment. It is considered that the front-side polarizing plate and the rear-side polarizing plate in a relationship satisfying Formula A-2 tend to be deformed to be convex on the backlight unit side in a high-humidity environment in a state where the front-surface plate and the adhesive layer, each described above, are not integrally laminated. On the other hand, the present inventors have presumed that by making a liquid crystal panel in which the front-side polarizing plate and the rear-side polarizing plate are in an integrally laminated state, together with the front-surface plate and the adhesive layer, each described above, satisfy Formula A-1, it is possible to deform the liquid crystal panel to be in a convex shape on the viewing side such that the occurrence of annular unevenness is suppressed in a high-humidity environment even though the front-side polarizing plate and the rear-side polarizing plate in a relationship satisfying Formula A-2 are included.

The front-side polarizing plate and the rear-side polarizing plate include at least a polarizer layer, can include a polarizer layer and at least one polarizing plate-protecting film, and preferably include a polarizer layer positioned between two polarizing plate-protecting films.

The modulus of elasticity of the polarizing plate can be adjusted by controlling the modulus of elasticity of either or both of the polarizer layer and the polarizing plate-protecting film. For example, the modulus of elasticity of the polarizer layer can generally be enhanced by increasing the molecular weight of a resin included in the polarizer layer. Further, in a case where the polarizer layer is a resin film, it is possible to improve the modulus of elasticity in the stretching direction by stretching the resin film. The modulus of elasticity of the polarizing plate-protecting film can be changed depending on the type of resins constituting the film, and can generally be improved by increasing the molecular weight or the crystallinity of the resin. By the addition of an additive which can play a role in filling the voids of the polarizing plate-protecting film, it is also possible to improve the modulus of elasticity of the polarizing plate-protecting film. Incidentally, by stretching the polarizing plate-protecting film, it is possible to improve the modulus of elasticity in the stretching direction. In addition, by the addition of a plasticizer, it is possible to lower the modulus of elasticity of the polarizing plate-protecting film.

The humidity dimensional change rate of the polarizing plate can be adjusted by controlling the humidity dimensional change rate either or both of the polarizer layer and the polarizing plate-protecting film. The humidity dimensional change rate of the polarizer layer can be changed depending on the type of the resin included in the polarizer layer, and the dimensional change rate can be increased by enhancing the hydrophilicity of the resin (a hydroxyl group equivalent or the like). Incidentally, in a case where the polarizer layer is a resin film, the humidity dimensional change rate in the direction perpendicular to the stretching direction can be increased by stretching the resin film. The humidity dimensional change rate of the polarizing plate-protecting film can be increased by adding a component including a hydroxyl group or adding a plasticizer. In addition, the humidity dimensional change rate in the direction perpendicular to the stretching direction can be increased by stretching.

(Polarizer Layer)

The polarizer layer only needs to be a so-called linear polarizer having a function of converting natural light into specific linearly polarized light. The polarizer layer is not particularly limited, but an absorptive polarizer can be used. As the absorptive polarizer, polarizers that are commonly used can be used, and for example, any of an iodine-based polarizer, a dye-based polarizer using a dichroic dye, a polyene-based polarizer, and a polarizer using a wire grid can be used. The iodine-based polarizer and the dye-based polarizer can generally be manufactured by adsorbing iodine or a dichroic dye onto a polyvinyl alcohol-based film, followed by stretching. In a preferred aspect of the polarizer layer, an iodine-dyed polyvinyl alcohol-based film can be exemplified. The thickness of the polarizer layer is not particularly limited, but may be, for example, from 0.1 µm to 50 µm or less. From the viewpoint of reducing the thickness of the polarizing plate, the thickness of the polarizer layer is preferably 30 µm or less, and more preferably 20 µm or less.

Moreover, the polarizer layer may be a so-called coating type polarizer. For the coating type polarizer, reference can be made to paragraphs 0052 to 0053 of JP2014-170202A.

(Polarizing Plate-Protecting Film)

As the polarizing plate-protecting film, various resin films which are usually used as a polarizing plate-protecting film can be used without any limitation. Further, the resin film only needs to have a function as a phase difference plate. The thickness of the polarizing plate-protecting film may be, for example, in a range of 5 to 80 µm, preferably in a range of 5 to 40 µm, and more preferably in a range of 5 to 25 µm. As the polarizing plate-protecting film, a commercially available product may be used, and a polarizing plate-protecting film produced by a known film forming method may also be used. From the viewpoint of transparency, as a preferred example of the polarizing plate-protecting film, a cellulose acylate film can be exemplified. Accordingly, either or both of the front-side polarizing plate and the rear-side polarizing plate can include at least one cellulose acylate film as the polarizing plate-protecting film. More preferably, the cellulose acylate film can include at least a cellulose acylate film as a polarizing plate-protecting film (inner protective film) positioned on the liquid crystal display element side, and may also include a cellulose acylate film as the outer protective film. With regard to the cellulose acylate film, a known technique can be applied without any limitation. With regard to the cellulose acylate included in the cellulose acylate film, reference can be made to, for example, paragraphs 0174 to 0177 of JP2014-170202A. Further, the polarizing plate-protecting film may be either a single film or a known laminated film having a multilayer structure with a monolayer, a bilayer, a trilayer, or a higher-layer.

The polarizing plate-protecting film can include one or more kinds of additives such as an ultraviolet absorbent and an antistatic agent at an arbitrary amount, in addition to resins such as cellulose acylate. With regard to such the additives, reference can be made to, for example, paragraphs 0187 to 0193 of JP2014-170202A. For a method for producing the polarizing plate-protecting film, a known technique can be applied without any limitation. With regard to the production method, reference can be made to, for example, paragraphs 0211 to 0214 of JP2014-170202A.

The above-described polarizing plate-protecting film may be bonded to a polarizer layer by known adhesives, pressure-sensitive adhesives, or the like. Further, the polarizing layer can be bonded to a liquid crystal display element by known adhesives, pressure-sensitive adhesives, or the like.

(Antistatic Agent)

For the purpose of preventing dust deposition on the surface of a liquid crystal panel, improving touch sensitivity, an antistatic agent may be included in at least one portion of the liquid crystal panel, and the antistatic agent is preferably included. Specific examples of the antistatic agent include antistatic agents known in the related art, such as a quaternary ammonium salt, an electrically conductive polymer, and electrically conductive particles. For example, as the electrically conductive polymer, those known in the related art, such as the electrically conductive polymers described in, for example, paragraphs 0013 to 0062 of JP2013-241556A, can be used. In addition, those known in the related art, such as the electrically conductive polymers described in, for example, paragraphs 0147 to 0148 of JP2009-175676A, can be used.

<Liquid Crystal Display Element>

Examples of the liquid crystal display element include a Twisted Nematic (TN) type, a Super-Twisted Nematic (STN) type, a Triple Super Twisted Nematic (TSTN) type, a multi-domain type, a Vertical Alignment (VA) time, an In Plane Switching (IPS) type, an Optically Compensated Bend (OCB) type, and the like. The liquid crystal display element generally has a configuration in which a liquid crystal layer is arranged between two glass substrates.

Furthermore, examples of the liquid crystal display element include an in-cell touch panel element and an on-cell touch panel display element, in which a touch panel function is incorporated into any one of the above-mentioned types of liquid crystal display elements. In addition, the examples can also include those in which a film-type touch sensor is bonded to a liquid crystal display element.

The in-cell touch panel liquid crystal display element can be, for example, an in-cell touch panel liquid crystal display element in which the function of a resistive film-type touch panel, a capacitance-type touch panel, an optical touch panel, or the like is incorporated into the inside of a liquid crystal element having a liquid crystal layer interposed between two glass substrates. To the in-cell touch panel liquid crystal element, for example, the known techniques described in JP2011-76602A, JP2011-222009A, and the like can be applied without limitation.

The on-cell touch panel liquid crystal display element can preferably be an on-cell touch panel liquid crystal display element in which the function of a resistive film-type touch panel, a capacitance-type touch panel, an optical touch panel, or the like is incorporated between the glass substrates having a liquid crystal layer interposed therebetween and a polarizing plate. The on-cell touch panel liquid crystal element is described in, for example, JP2012-88683A.

[Liquid Crystal Display Device]

One aspect of the present invention relates to a liquid crystal display device including the above-described liquid crystal panel described and a backlight unit.

The details of the liquid crystal panel is as set forth above.

The backlight unit included in the liquid crystal display device is not particularly limited, and may be either an edge-light-type backlight unit or a direct type backlight unit. The backlight unit can include one or more of known members such as a light source, a diffusion plate, a reflecting plate, a light guide plate, a brightness improving film, and a prism sheet.

Examples

Hereinafter, the present invention will be described in more detail with reference to Examples. The materials, reagents, the amounts and ratios of the materials, operations, and the like shown in the following Examples can be appropriately changed within a scope that does not depart from the gist of the present invention. Accordingly, the scope of the present invention is not limited to the following specific examples. In the following description, "%" means "% by mass" unless otherwise specified. The steps described below are carried out at room temperature unless otherwise specified. Here, the room temperature refers to a temperature in a range of 20° C. to 25° C.

[Manufacture of Front-Surface Plate]

<Preparation of Actinic Energy Ray-Curable Composition>

The respective components were added based on the compositions shown in Table 1, and filtration was carried out using a polypropylene-made filter having a pore diameter of 10 μm to prepare actinic energy ray-curable compositions HC1 to HC5. With regard to the components other the solvent, the numerical values in Table 1 represent the "proportions (% by mass) of the total amount of the solid content in the actinic energy ray-curable compositions" of the respective components. That is, for materials diluted in a solvent, such as inorganic particles (ELECOMV-8802 manufactured by Nippon Shokubai Co., Ltd.), the components were added such that the ratio of the solid content was adjusted to the amount described in Table 1. The solvent was adjusted such that the ratio of the solvent became to the ratio described in Table 1, thereby preparing an actinic energy ray-curable composition having a ratio of the solid content of 60% by mass.

TABLE 1

| Actinic energy ray-curable composition | | HC1 | HC2 | HC3 | HC4 | HC5 |
|---|---|---|---|---|---|---|
| Polymerizable compound | DPHA manufactured by Nippon Kayaku Co., Ltd. | 65.0% | 64.0% | 50.0% | 45.0% | 45.0% |
| | CYCLOMER M100 manufactured by Daicel Chemical Industries, Ltd. | | 15.0% | | | |
| | BLEMMER GLM manufactured by Nippon Oil and Fats Co., Ltd. | 30.0% | | 30.0% | 50.0% | |
| | BPZA-66 manufactured by Kyoeisha Chemical Co., Ltd. | | | | | 50.0% |
| Inorganic particles | ELCOM V-8802 manufactured by Nippon Shokubai Co., Ltd. | | | 15.0% | 15.0% | |
| Photopolymerization initiator | Irg184 manufactured by BASF | 4.0% | 4.0% | 4.0% | 4.0% | 4.0% |
| | Cationic photopolymerization initiator PAG-1 | | 1.0% | | | |
| Antifouling agent | RS-90 manufactured by DIC Corporation | 1.0% | 1.0% | 1.0% | 1.0% | 1.0% |
| Solvent | Methyl ethyl ketone | 40% | 40% | 40% | 40% | 40% |
| | Methyl isobutyl ketone | 60% | 60% | 60% | 60% | 60% |

(Polymerizable Compound)
DPHA manufactured by Nippon Kayaku Co., Ltd.: Mixture of dipentaerythritol pentaacrylate and dipentaerythritol hexaacrylate
CYCLOMER M100 manufactured by Daicel Chemical Industries, Ltd.: 3,4-Epoxycyclohexylmethyl methacrylate
BLEMMER GLM manufactured by Nippon Oil and Fats Co., Ltd.: Glycerol monomethacrylate
BPZA-66 manufactured by Kyoeisha Chemical Co., Ltd.: Urethane bond-containing, radically polymerizable compound
(Inorganic Particles)
ELCOM V-8802 manufactured by Nippon Shokubai Co., Ltd.
(Photopolymerization Initiator)
Irg184 (IRGACURE184, 1-hydroxy-cyclohexyl-phenyl-ketone, α-hydroxyalkylphenone-based radical photopolymerization initiator, manufactured by BASF)
PAG-1 (iodonium chloride compound (cationic photopolymerization initiator))
(Antifouling Agent)
RS-90 manufactured by DIC Corporation <Manufacture of Resin Film>

(Resin Film: B-1)

A cellulose acylate film (laminated film) with a three-layer configuration (external layer/core layer/external layer) was manufactured by the following method.

1) Preparation of Cellulose Acylate Dope for Core Layer

The following composition was put into a mixing tank and stirred to dissolve the respective components to obtain a cellulose acylate dope for a core layer.

| Cellulose acylate dope for a core layer | |
|---|---|
| Cellulose acetate having acetyl substitution degree of 2.88 and weight-average molecular weight of 260,000 | 100 parts by mass |
| Phthalic ester oligomer A having the following structure | 10 parts by mass |
| Compound (A-1) represented by Formula I | 4 parts by mass |

-continued

| Cellulose acylate dope for a core layer | |
|---|---|
| Ultraviolet absorbent (compound represented by Formula II, manufactured by BASF) | 2.7 parts by mass |
| Light stabilizer (TINUVIN123, manufactured by BASF) | 0.18 parts by mass |
| N-Alkenylpropylenediamine triacetate (TEKURAN DO manufacture by Nagase ChemteX Corporation) | 0.02 parts by mass |
| Methylene chloride (first solvent) | 430 parts by mass |
| Methanol (second solvent) | 64 parts by mass |

Phthalic ester oligomer A weight-average molecular weight: 750

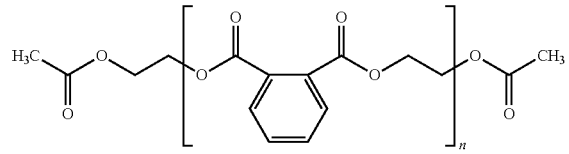

Compound (A-1) represented by Formula I

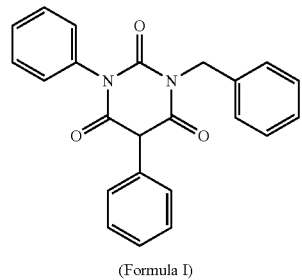 [SMILES: O=C1C(c2ccccc2)C(=O)N(c2ccccc2)C(=O)N1Cc1ccccc1]

(Formula I)

Compound (Ultraviolet Absorbent) Represented by Formula II

Formula (II)

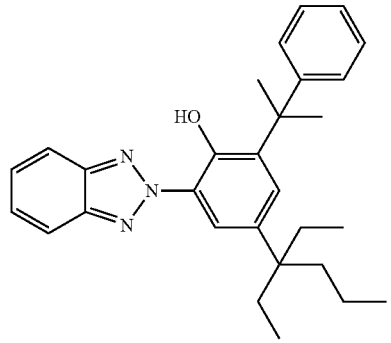

2) Preparation of Cellulose Acylate Dope for External Layer 10 parts by mass of the following inorganic particle-containing composition was added to 90 parts by mass of the cellulose acylate dope for the core layer to prepare a cellulose acylate dope solution for an external layer.

| Inorganic particle-containing composition | |
|---|---|
| Silica particles having average primary particle diameter of 20 nm (AEROSIL R972 manufactured by Nippon Aerosil Co.) | 2 parts by mass |
| Methylene chloride (first solvent) | 76 parts by mass |
| Methanol (second solvent) | 11 parts by mass |
| Cellulose acylate dope for core layer | 1 part by mass |

3) Preparation of Resin Film B-1

Three layers of the cellulose acylate dope for a core layer and the cellulose acylate dopes for an external layer casted on both the sides thereof were casted simultaneously onto a drum at a surface temperature of 20° C. from a casting outlet. The layers were peeled off with a solvent content of about 20% by mass, were secured using tenter clips at both terminals in the width direction of the film, and dried while being stretched at 1.18 times in the horizontal direction with a residual solvent content of 3% to 15% by mass. Thereafter, the layers were transported between the rolls of a heat treatment device, and further dried to manufacture a base material B-1 having a thickness of 220 μm.

(Resin Film: B-2)

As a resin film B-2, a commercially available resin film (a thickness of 300 μm, TECHNOLLOY C-101 manufactured by Sumika Acryl Co., Ltd.) with a three-layer structure in which a PMMA film/a polycarbonate film/a PMMA film were laminated in this order was used.

(Easily Adhesive Layer-Attached Resin Film: B-3)

1) Preparation of Composition of Forming Easily Adhesive Layer

A sulfonic acid-based aqueous dispersion of a polyester-based resin obtained by copolymerizing a polymerizable compound having the following composition was obtained.

(Acid component) Terephthalic acid/isophthalic acid/5-sodiumsulfophthalic acid/(diol component) ethylene glycol/diethylene glycol=44/46/10/84/16 (molar ratio)

Next, a crosslinking agent (isocyanate-based compound A) was prepared in the following procedure.

A 4-neck flask (reactor) equipped with a stirrer, a thermometer, a reflux cooling pipe, and a nitrogen introduction pipe was purged with nitrogen atmosphere. 1,000 parts by mass of hexamethylene diisocyanate (HDI) and 22 parts by mass of trimethylolpropane (with a molecular weight of 134) as a trihydric alcohol were introduced into the flask, and subjected to urethanization while the temperature of the reaction solution in the reactor under stirring was kept at 90° C. for 1 hour. Thereafter, the temperature of the reaction solution was kept at 60° C., an isocyanuratization catalyst, trimethylbenzylammonium•hydroxide was added to the flask, and phosphoric acid was added thereto at a point of time when the inversion rate reached 48% to stop the reaction. Thereafter, the reaction solution was filtered, and then unreacted HDI was removed using a thin-film distillator.

The obtained isocyanate-based compound A had a viscosity at 25° C. of 25,000 mPa·s, a content of the isocyanate groups of 19.9% by mass, a number-average molecular weight of 1,080, and an average number of isocyanate groups of 5.1. The number-average molecular weights described above and below were number-average molecular weights which can be determined from values measured by GPC in terms of polystyrene. Thereafter, the presence of a urethane bond, an allophanate bond, and an isocyanurate bond was confirmed by means of Nuclear Magnetic Resonance (NMR) measurement.

A 4-neck flask (reactor) equipped with a stirrer, a thermometer, a reflux cooling pipe, a nitrogen introduction pipe, and a dropping funnel was purged with nitrogen atmosphere. 100 parts by mass of the isocyanate-based compound A obtained above, 42.3 parts by mass of methoxypolyethylene glycol with a number-average molecular weight 400, and 76.6 parts by mass of dipropylene glycol dimethyl ether were introduced into the flask, and the temperature of the reaction solution was kept at 80° C. for 6 hours. Thereafter, the temperature of the reaction solution was cooled at 60° C., 72 parts by mass of diethyl malonate and 0.88 parts by mass of a 28% methanol solution of sodium methylate were added thereto, the mixture was held as it was for 4 hours, and then, 0.86 parts by mass of 2-ethylhexyl acid phosphate was added thereto. Subsequently, 43.3 parts by mass of diisopropylamine was added thereto, and the temperature of the reaction solution was kept at 70° C. for 5 hours. The reaction solution was analyzed by means of gas chromatography to confirm that the reaction rate of diisopropylamine was 70%, thereby an isocyanate-based compound A (a concentration of the solid content of 70% by mass, and a mass of effective NCO groups of 5.3%).

57.6 parts by mass of a carboxylic acid-modified polyvinyl alcohol resin (manufactured by KURARAY CO., LTD.) with a degree of saponification of 77% and a degree of polymerization of 600, 28.8 parts by mass (solid content) of the above-manufactured polyester-based resin, 4.0 parts by mass of the above-manufactured isocyanate-based compound A, 0.7 parts by mass of an organic tin-based compound (ERASTRON Cat•21 manufactured by DKS Co., Ltd.), and 8.1 parts by mass of a silica sol having an average primary particle diameter of 80 nm were mixed, and the mixture was diluted such that the solid content reached 8.9 parts by mass to prepare a composition for forming an easily adhesive layer.

2) Manufacture of Resin Film

A polyester-based resin film (laminated film) with three layers (layer I/layer II/layer III) was manufactured by the following method.

A molten resin for forming the layer II positioned between the layer I and the layer III was prepared by drying
  a raw material polyester 1: 90 parts by mass, and
  a raw material polyester 2 containing 10 parts by mass of an ultraviolet absorbent (2,2'-(1,4-phenylene)bis(4H-3,1-benzoxazin-4-one): 10 parts by mass
until a moisture content thereof reached 20 ppm (by mass) or less, and then the residue was put into a hopper 1 of a single screw kneading extruder with a diameter of 50 mm and melted at 300° C. in the extruder 1.

A resin composition for forming the layer I and the layer was prepared by drying the raw material polyester 1 until a moisture content thereof reached 20 ppm (by mass) or less, and then the resultant was put into a hopper 2 of a single screw extruder 2 with a diameter of 30 mm, and then melted at 300° C. in the extruder 2.

The two kinds of molten resins were respectively passed through a gear pump and a filter (pore size: 20 μm). Then, through a block by which the two kinds of resins become confluent as three layers, the resins were laminated such that the molten resin extruded from the extruder 1 become the internal layer (layer II) and that the molten resin extruded from the extruder 2 became the external layers (layer I and layer III), and then extruded in the shape of a sheet from a die having a width of 120 mm.

The molten resin sheet extruded from the die was extruded onto a cooling cast drum set to be at a surface temperature of 25° C. and caused to come into close contact with the cooling cast drum by using a method of applying static electricity. By using a peeling roll disposed to face the cooling cast drum, the resin sheet was peeled, thereby obtaining a non-stretched film. At this time, the amount of resin discharged from each extruder was adjusted such that a thickness ratio of layer I:layer II:layer III became 10:80:10.

By using a group of heated rolls and an infrared heater, the non-stretched film was heated such that the surface temperature of the film reached 95° C. Then, by using a group of rolls having different circumferential speeds, the film was 4.0 times stretched in the direction perpendicular to the movement direction of the film, thereby obtaining a 100-μm resin film (laminated film).

3) Manufacture of Easily Adhesive Layer-Attached Resin Film

One surface of the above-manufactured resin film was subjected to a corona discharge treatment in a treatment amount of 500 J/m$^2$. Then, the surface having undergone the corona discharge treatment was coated with the composition for forming an easily adhesive layer by a reverse roll method while the amount of the composition was being adjusted such that the thickness after drying reached 0.1 μm, thereby manufacturing an easily adhesive layer-attached resin film B-3.

(Easily Adhesive Layer-Attached Resin Film: B-4)

In the same method as for the easily adhesive layer-attached resin film B-3 except that the film thickness after stretching was set to 125 μm in the manufacture of the resin film, an easily adhesive layer-attached resin film B-4 was manufactured.

(Resin Film: B-5)

Pellets of an acrylic resin (trade name, SUMIPEX EX) manufactured by Sumitomo Chemical Co., Ltd were put into a single screw extruder having an extrusion diameter of 65 mmφ, and a polycarbonate-based resin (trade name, CALIBRE 301-10) manufactured by Sumika Styron Polycarbonate Limited was put into a single screw extruder with an extrusion diameter of 45 mmφ. The resins were melted and integrated by being melted and laminated by a multi-manifold method, and extruded through a T-shaped dies set to be at a temperature of 260° C. The obtained film-shaped substance was interposed between a pair of metal rolls and molded, thereby manufacturing a resin film B-5 having a thickness of 260 μm, constituted with three layers formed of acrylic resin film/polycarbonate resin film/acrylic resin film.

(Resin Film: B-6)

In the same method as for the resin film B-1 except that the thickness of the resin film was set to 240 μm, a resin film B-6 was manufactured.

(Easily Adhesive Layer-Attached Resin Film: B-7)

In the same method as for the easily adhesive layer-attached resin film B-3 except that the film thickness after stretching was set to 85 μm in the manufacture of the resin film, an easily adhesive layer-attached resin film B-7 was manufactured.

(Easily Adhesive Layer-Attached Resin Film: B-8>

In the same method as for the easily adhesive layer-attached resin film B-3 except that the stretching ratio in the manufacture of the resin film was set to 5 times, an easily adhesive layer-attached resin film B-8 (thickness of 100 μm) was manufactured.

<Formation of Actinic Energy Ray-Curable Layer>

In Examples 1 to 11, and Comparative Examples 1 to 9, any one of the compositions HC1 to HC5 for forming an actinic energy ray-curable layer was used to adjust the thickness (total thickness) of the front-surface plate after curing the actinic energy ray-curable composition to the thickness shown in Table 2, as shown in Table 2, and each of the actinic energy ray-curable compositions was applied onto one surface of the resin film shown in Table 2 and cured to form a cured layer, thereby manufacturing a front-surface plate. In the resin film having the easily adhesive layer, the easily adhesive layer surface was coated with the actinic energy ray-curable composition.

The coating and curing methods were carried out, specifically as follows. Each of the actinic energy ray-curable compositions was coated by a die coating method using the slot die described in Example 1 of JP2006-122889A under the condition of a conveying speed of 30 m/min, and dried at an atmosphere temperature of 60° C. for 150 seconds.

Then, the coated layer was further cured by irradiation with ultraviolet rays at an irradiation dose of 500 mJ/cm$^2$ and an illuminance of 400 mW/cm$^2$ by using an air-cooled metal halide lamp (manufactured by Eye Graphics Co., Ltd.) of 160 W/cm at an oxygen concentration of about 0.1% by volume under purging with nitrogen to cure the composition, thereby forming a cured layer, which was then wound up.

[Manufacture of Polarizing Plate]

<Manufacture of Polarizing Plate-Protecting Film>

A polarizing plate-protecting film was manufactured by the following method.

(Polarizing Plate-Protecting Film C-1)

In the same method as for the resin film B-1 except that the thickness (the total thickness of the laminated film) was set to 6 μm, a polarizing plate-protecting film C-1 was manufactured.

(Polarizing Plate-Protecting Film C-2)

In the same method as for the resin film B-1 except that the amount of the phthalic acid oligomer A to be added was set to 5 parts by mass, the amount of the compound A-1 to be added was set to 2 parts by mass, the thickness (the total thickness of the laminated film) was set to 5 μm, and the stretching ratio in the horizontal direction was set to 1.30 times, a polarizing plate-protecting film C-2 was manufactured.

(Polarizing Plate-Protecting Film C-3)

In the same method as for the resin film B-1 except that the thickness (the total thickness of the laminated film) was set to 25 μm, a polarizing plate-protecting film C-3 was manufactured.

(Polarizing Plate-Protecting Film C-4)

1) Preparation of Cellulose Acylate Dope

The following composition was put into a mixing tank and stirred to dissolve the respective components to obtain a cellulose acylate dope.

| Cellulose acylate dope | |
|---|---|
| Cellulose acylate (cellulose acetate) having acetyl substitution degree of 2.86 | 100 parts by mass |
| Condensation of ethane diol/adipic acid (1/1 molar ratio) with number-average molecular weight of 1,000 | 25 parts by mass |
| Compound (A-1) represented by Formula I | 4 parts by mass |
| Ultraviolet absorbent (compound represented by Formula II, manufactured by BASF) | 2 parts by mass |
| Silicon dioxide particles (average primary particle diameter of 16 nm) | 0.02 parts by mass |
| Methylene chloride (first solvent) | 324 parts by mass |
| Methanol (second solvent) | 72 parts by mass |
| Butanol (third solvent) | 4 parts by mass |

2) Manufacture of Cellulose Acylate Film

The cellulose acylate dope was casted onto a drum at a surface temperature of −5° C. from a casting outlet. The film was peeled off with a solvent content of about 20% by mass, secured using tenter clips at both terminals in the width direction of the film, and dried while being stretched at 1.21 times in the horizontal direction with a residual solvent content of 30% to 40% by mass. Thereafter, the film was transported between the rolls of a heat treatment device, and further dried to manufacture a polarizing plate-protecting film C-4 having a thickness of 6 μm.

(Polarizing Plate-Protecting Film C-5)

1) Preparation of Cellulose Acylate Dope

The following composition was put into a mixing tank and stirred to dissolve the respective components to obtain a cellulose acylate dope.

| Cellulose acylate dope | |
|---|---|
| Cellulose acylate (cellulose acetate) having acetyl substitution degree of 2.86 | 100 parts by mass |
| Mixture of triphenyl phosphate/biphenyldiphenyl phosphate (2/1 mass ratio) | 12 parts by mass |
| Compound (A-1) represented by Formula I | 4 parts by mass |
| Ultraviolet absorbent (compound represented by Formula II, manufactured by BASF) | 2 parts by mass |
| Silicon dioxide particles (average primary particle diameter of 16 nm) | 0.02 parts by mass |
| Methylene chloride (first solvent) | 348 parts by mass |
| Methanol (second solvent) | 52 parts by mass |

2) Manufacture of Cellulose Acylate Film

The cellulose acylate dope was casted onto a drum at a surface temperature of −5° C. from a casting outlet. The film was peeled off with a solvent content of about 20% by mass, secured using tenter clips at both terminals in the width direction of the film, and dried while being stretched at 1.21 times in the horizontal direction with a residual solvent content of 30% to 40% by mass. Thereafter, the film was transported between the rolls of a heat treatment device, and further dried to manufacture a polarizing plate-protecting film C-5 having a thickness of 5 μm.

(Polarizing Plate-Protecting Film C-6)

In the same method as for the polarizing plate-protecting film C-5 except that the stretching ratio in the horizontal direction was set to 1.01 times and the thickness was set to 25 μm, a polarizing plate-protecting film C-6 was manufactured.

(Polarizing Plate-Protecting Film C-7)

In the same method as for the resin film B-1 except that the stretching ratio in the horizontal direction was set to 1.12 times and the thickness (the total thickness of the laminated film) was set to 5 μm, a polarizing plate-protecting film C-7 was manufactured.

(Polarizing Plate-Protecting Film C-8)

In the same method as for the resin film B-1 except that the thickness (the total thickness of the laminated film) was set to 5 μm, a polarizing plate-protecting film C-8 was manufactured.

(Polarizing Plate-Protecting Film C-9)

In the same method as for the polarizing plate-protecting film C-5 except that the stretching ratio in the horizontal direction was set to 1.01 times and the thickness was set to 5 μm, a polarizing plate-protecting film C-9 was manufactured.

(Polarizing Plate-Protecting Film C-10)

In the same method as for the polarizing plate-protecting film C-4 except that the stretching ratio in the horizontal direction was set to 1.15 times and the thickness was 5 μm, a polarizing plate-protecting film C-10 was manufactured.

<Saponification of Polarizing Plate-Protecting Film>

The manufactured polarizing plate-protecting film was immersed in a 1.5 mol/L aqueous NaOH solution (saponification solution) temperature-controlled at 55° C. for 2 minutes, and then washed with water. Thereafter, the film was immersed in a 0.05 mol/L aqueous sulfuric acid solution at a liquid temperature of 25° C. for 30 seconds, and then further passed through a water washing bath for 30 seconds. Further, the film was subjected to dehydration using an air knife three times to remove water, and then and retained in a drying zone at an atmosphere temperature of 70° C. for 15 seconds to be dried, thereby manufacturing a saponification-treated polarizing plate-protecting film.

<Manufacture of Polarizer (Polarizer Layer)>
(Polarizer: P-1)

According to Example 1 described in JP2001-141926A, iodine was adsorbed onto a stretched polyvinyl alcohol-based film to manufacture a polarizer (iodine-dyed polyvinyl alcohol-based film) P-1 having a thickness of 8 µm.

(Polarizer: P-2)

In the same manner as for the polarizer P-1 except that the thickness was set to 2 µm, a polarizer P-2 was manufactured.

<Manufacture of Front-Side Polarizing Plate and Rear-Side Polarizing Plate (Bonding of Polarizer with Polarizing Plate-Protecting Film)>

A polarizing plate-protecting film was bonded with the above-manufactured polarizer having nothing bonded on both surfaces thereof, whose combination of the inner protective film, the outer protective film, and the polarizer is as shown in Table 2, using a 3% by mass aqueous polyvinyl alcohol (PVA-117H manufactured by KURARAY Co., Ltd.) solution as an adhesive, and dried at an atmosphere temperature 70° C. for 10 minutes or more for bonding. Here, the films were bonded by such an arrangement that the longitudinal direction of the manufactured polarizer was in parallel with the longitudinal direction of the polarizing plate-protecting film.

[Evaluation of Front-Surface Plate, Front-Side Polarizing Plate, and Rear-Side Polarizing Plate]

For the manufactured front-surface plate, front-side polarizing plate, and rear-side polarizing plate, the modulus of elasticity and the humidity dimensional change rate were measured by the afore-described methods. As a tensile compression tester, STROGRAPH-R2 manufactured by Toyo Seiki Seisaku-Sho, Ltd. was used.

[Manufacture of Liquid Crystal Display Device]
<Preparation of Pressure-Sensitive Adhesive (Composition for Forming Adhesive Layer)>

The following pressure-sensitive adhesives S-1 to S-5 were manufactured.

(Pressure-Sensitive Adhesive: S-1)

1) Preparation of Polymer (A)

97 parts by mass of n-butyl acrylate, 3.0 parts by mass of acrylic acid, 200 parts by mass of ethyl acetate, and 0.08 parts by mass of 2,2'-azobisisobutyronitrile were introduced into a reaction vessel equipped with a stirrer, a thermometer, a reflux cooler, a dropping funnel, and a nitrogen introduction pipe, and the air in the reaction vessel was replaced with nitrogen gas. While stirring the mixture in the nitrogen atmosphere, the reaction solution was warmed to 60° C., reacted for 13 hours, and then cooled to room temperature to obtain a diluted solution of a polymer (A). Here, the weight-average molecular weight of the obtained polymer (A) was 800,000.

2) Preparation of Polymer (B)

85.0 parts by mass of n-butyl acrylate, 15.0 parts by mass of 2-hydroxyethyl acrylate, 200 parts by mass of ethyl acetate, 0.16 parts by mass of 2,2'-azobisisobutyronitrile, and 0.3 parts by mass of 2-mercaptoethanol were introduced into a reaction vessel equipped with a stirrer, a thermometer, a reflux cooler, a dropping funnel, and a nitrogen introduction pipe, and the air in the reaction vessel was replaced with nitrogen gas. While stirring the mixture in the nitrogen atmosphere, the reaction solution was warmed to 70° C., reacted for 6 hours, and then cooled to room temperature to obtain a diluted solution of a polymer (B). Here, the weight-average molecular weight of the obtained polymer (B) was 300,000.

3) Preparation of Pressure-Sensitive Adhesive 100 parts by mass (value converted in terms of a solid content) of the polymer (A) and 25 parts by mass (value converted in terms of a solid content) of the polymer (B), each obtained above, were mixed, and then 3.4 parts by mass of an adduct-type isocyanate-based crosslinking agent (Coronate L manufactured by Nippon Polyurethane Industry Co., Ltd.) was added thereto. Further, 0.2 parts by mass of 3-glycidoxypropyltrimethoxysilane (KBM403 manufactured by manufactured by Shin-Etsu chemical Co., Ltd.) were added thereto, and the mixture was sufficiently stirred to obtain a diluted solution (pressure-sensitive adhesive S-1) of the pressure-sensitive adhesive.

(Pressure-Sensitive Adhesive: S-2)

In the same method as for the pressure-sensitive adhesive S-1 except that 95 parts by mass of n-butyl acrylate, 4 parts by mass of acrylic acid, and 1 part by mass of 2-ethylhexyl acrylate were used instead of 97 parts by mass of n-butyl acrylate and 3.0 parts by mass of acrylic acid in the preparation of the polymer (A), and the polymer (B) was not added and the amount of the adduct-type isocyanate-based crosslinking agent (Coronate L manufactured by Nippon Polyurethane Industry Co., Ltd.) to be added was set to 0.2 parts by mass in the preparation of the pressure-sensitive adhesive, a diluted solution (pressure-sensitive adhesive S-2) of the pressure-sensitive adhesive was obtained. Here, the weight-average molecular weight of the obtained polymer (A) was 2,000,000.

(Pressure-Sensitive Adhesive: S-3)

In the same method as for the pressure-sensitive adhesive S-1 except that 95 parts by mass of n-butyl acrylate and 5.0 parts by mass of acrylic acid were used instead of 97 parts by mass of n-butyl acrylate and 3.0 parts by mass of acrylic acid in the preparation of the polymer (A), a diluted solution (pressure-sensitive adhesive S-3) of the pressure-sensitive adhesive was obtained. Here, the weight-average molecular weight of the obtained polymer (A) was 2,000,000.

(Pressure-Sensitive Adhesive: S-4)

In the same method as for the pressure-sensitive adhesive S-1 except that 60 parts by mass of 2-ethylhexyl acrylate, 30 parts by mass of 2-hydroxyethyl acrylate, and 2 parts by mass of methyl methacrylate were used instead of 97 parts by mass of n-butyl acrylate and 3.0 parts by mass of acrylic acid in the preparation of the polymer (A), and the polymer (B) was not added and the amount of the adduct-type isocyanate-based crosslinking agent (Coronate L manufactured by Nippon Polyurethane Industry Co., Ltd.) to be added was set to 3.0 parts by mass in the preparation of the pressure-sensitive adhesive, a diluted solution (pressure-sensitive adhesive S-4) of the pressure-sensitive adhesive was obtained. Here, the weight-average molecular weight of the obtained polymer (A) was 2,500,000.

(Pressure-Sensitive Adhesive: S-5)

In the same method as for the pressure-sensitive adhesive S-1 except that 68 parts by mass of 2-ethylhexyl acrylate, 30 parts by mass of 2-hydroxyethyl acrylate, and 2 parts by mass of methyl methacrylate were used instead of 97 parts by mass of n-butyl acrylate and 3.0 parts by mass of acrylic acid in the preparation of the polymer (A), and the polymer (B) was not added and the amount of the adduct-type isocyanate-based crosslinking agent (Coronate L manufactured by Nippon Polyurethane Industry Co., Ltd.) to be added was set to 2.5 parts by mass in the preparation of the pressure-sensitive adhesive, a diluted solution (pressure-sensitive adhesive S-5) of the pressure-sensitive adhesive was obtained. Here, the weight-average molecular weight of the obtained polymer (A) was 2,500,000.

(Manufacture of Adhesive Sheet for Measuring Stress Relaxation Rate)

The above-manufactured pressure-sensitive adhesive was applied onto a peeling-treated surface of a peeling sheet (SP-PET3811 manufactured by LINTEC Corporation) obtained by subjecting one surface of a polyethylene terephthalate film to a peeling treatment with a silicone-based release agent, such that the applied thickness after drying reached 25 μm, and heated at an atmosphere temperature of 100° C. for 1 minute to form an adhesive layer. With this adhesive layer, another peeling sheet (SP-PET3801 manufactured by LINTEC Corporation) obtained by subjecting one surface of a polyethylene terephthalate film to a peeling treatment with a silicone-based release agent was bonded to obtain an adhesive sheet.

(Evaluation of Stress Relaxation Rate of Adhesive Layer)

The above-manufactured adhesive sheet was cut into a size of a width of 10 mm×a length of 160 mm, and a stress relaxation rate was determined by the method described above, using a tensile tester (Tensilon tester manufactured ORIENTEC).

<Installation in IPS Mode Liquid Crystal Television>

Two polarizing plates of a commercially available IPS mode liquid crystal television (42LS5600 manufactured by LG Electronics) were peeled, and the polarizing plates were bonded to the front side and the rear side, respectively, via a pressure-sensitive adhesive such that the front-side polarizing plate was on the the front side (the viewing side) and the rear-side polarizing plate was on the rear side (backlight side), with each of the inner polarizing plate-protecting films being on the liquid crystal cell side. A crossed nicols disposition was made so that the absorption axis of the front-side polarizing plate was in the longitudinal direction (transverse direction) and the transmission axis of the rear-side polarizing plate was in the longitudinal direction (transverse direction). The thickness of the glass substrate used in the liquid crystal cell was 0.5 mm. In addition, the pressure-sensitive adhesive was prepared by the method described in Production Examples 1 of JP2003-50313A.

Thereafter, a front-surface plate was bonded onto the surface of the outer protective film of the front-side polarizing plate via an adhesive layer (pressure-sensitive adhesive) to manufacture a liquid crystal display device (IPS mode liquid crystal television). The combinations of the front-surface plate, the adhesive layer (pressure-sensitive adhesive), the front-side polarizing plate, and the rear-side polarizing plate in the manufactured liquid crystal display device were as shown in Tables 2 and 3. The bonding between the front-surface plate and the front-side polarizing plate was carried out by the following method.

Any one of the pressure-sensitive adhesives S-1 to S-5 (refer to Table 2) was applied onto a peeling-treated surface of a peeling sheet (SP-PET3811 manufactured by LINTEC Corporation, thickness of 38 μm) obtained by subjecting one surface of a polyethylene terephthalate film to a peeling treatment with a silicone-based release agent, such that the thickness after drying became the thickness shown in Table 2, and then subjected to a heating treatment at an atmosphere temperature of 90° C. for 1 minute to form an adhesive layer, thereby an adhesive sheet. Then, the adhesive sheet was bonded such that the outer protective film surface of the front-side polarizing plate was in contact with the adhesive layer surface of the above-manufactured adhesive sheet. Thereafter, the peeling sheet of the adhesive sheet was peeled, and the above-manufactured front-surface plate was bonded such that the adhesive layer surface was in contact with the front-surface plate surface (the resin film surface or the easily adhesive layer surface), which was maintained (aged) in an environment of an atmosphere temperature of 23° C. and a relative humidity of 50% for 7 days, thereby obtaining liquid crystal display devices of Examples and Comparative Examples. With regard to Examples and Comparative Examples, for each of evaluation of annular unevenness, evaluation of circular unevenness, measurement of warping of liquid crystal panels after being left in a high-humidity environment, measurement of thickness of each of the constitutive members, and evaluation of pencil hardness, each described below, a plurality of liquid crystal display devices were manufactured.

Moreover, the display characteristics of the liquid crystal display devices of Examples and Comparative Examples were confirmed, and thus, the brightness and the color tone from the front surface and the inclination were as good as the commercially available liquid crystal televisions. These results implicate that in the manufacture of liquid crystal display devices of Examples and Comparative Examples, display abnormality caused by a step of changing constitutive member of commercially available liquid crystal televisions did not occur.

[Evaluation and Measurement of Liquid Crystal Display Device and Liquid Crystal Panel]

<Evaluation of Annular Unevenness>

Each of the above-manufactured liquid crystal display devices of Examples and Comparative Examples was left to stand in an environment of an atmosphere temperature of 50° C. and a relative humidity of 80% for 72 hours while the backlight unit of the liquid crystal display device was on, and then left to stand in an environment of an atmosphere temperature of 25° C. and a relative humidity of 80% for 1 hour. Then, display unevenness (annular unevenness) shown in the peripheral portion of the display surface of the liquid crystal display device was evaluated in the following manner. The liquid crystal display devices of the evaluation results A to C were sufficiently acceptable in a practical use, but the liquid crystal display device of the evaluation result D had occurrence of annular unevenness to an extent that annular unevenness was not acceptable in a practical use. The evaluation results are shown in Table 4.

A: Annular unevenness is not visually recognized (to an extent that light leakage from the display surface is the same as in the initial state).

B: Annular unevenness is slightly visually recognized, but is acceptable.

C: Annular unevenness is visually recognized, but is acceptable.

D: Annular unevenness is significantly visually recognized, and thus not acceptable.

<Evaluation of Circular Unevenness>

Each of the above-manufactured liquid crystal display devices of Examples and Comparative Examples was left to stand in an environment of an atmosphere temperature of 50° C. and a relative humidity of 80% for 72 hours while the backlight unit of the liquid crystal display device was on, and then left to stand in an environment of an atmosphere temperature of 25° C. and a relative humidity of 80% for 1 hour. Then, display unevenness (circular unevenness) shown in the central portion of the display surface of the liquid crystal display device was evaluated in the following manner. The image display device of the evaluation result A or B was sufficiently acceptable in a practical use, but the liquid crystal display device of the evaluation result C had occurrence of circular unevenness to an extent that display unevenness was not acceptable in a practical use. The evaluation results are shown in Table 4.

A: Circular unevenness is not visually recognized (to an extent that light leakage of the panel is the same as in the initial state).

B: Circular unevenness is slightly visually recognized, but is acceptable.

C: Circular unevenness is visually recognized, and thus not acceptable.

<Measurement of Warping of Liquid Crystal Panel after being Left to Stand in High-Humidity Environment>

Each of the above-manufactured liquid crystal display devices of Examples and Comparative Examples was left to stand in an environment of an atmosphere temperature of 50° C. and a relative humidity of 80% for 72 hours while the backlight unit of the liquid crystal display device was on, and then left to stand in an environment of an atmosphere temperature of 25° C. and a relative humidity of 80% for 1 hour. Then, the height of the central portion with respect to the peripheral portion of the liquid crystal panel was measured according to a standard of a metal ruler. A case where the numerical value is positive indicates that the central portion is protruded, while a case where the numerical value is negative indicates that the central portion is recessed. That is, a case where the numerical value is positive indicates that the liquid crystal panel is deformed to be in a convex shape on the viewing side, while a case where the numerical value is negative indicates that the liquid crystal panel is deformed to be in a convex shape on the backlight unit side. The evaluation results are shown in Table 4.

<Measurement of Thickness of Each Constitutive Member>

The cross-section of the liquid crystal panel included in the produced image display device was observed by a scanning electron microscope (SEM), and the thicknesses of the front-surface plate, the adhesive layer, the front-side polarizing plate, and the rear-side polarizing plate were measured.

The thickness was specifically determined by the following method. A cross-section of the liquid crystal panel was exposed by a microtome, and then the cross-section was observed with SEM (magnification: 5 times) in the exposed cross-section. With an average value of the thicknesses obtained at two points randomly extracted in the thickness direction in the observation of cross-sections, the thicknesses of the front-surface plate, adhesive layer, the front-side polarizing plate, and the rear-side polarizing plate were determined. The measurement results are shown in Tables 2 and 3. Further, the column of A-1 in Table 3 shows the calculated values of "$ECp \times dCp \times \varepsilon Cp \times (100-P)/100 + (Ef \times df \times \varepsilon f) - (Er \times dr \times \varepsilon r)$" of each of Examples and Comparative Examples.

TABLE 2

| | Front-surface plate | | | | | | | | | |
| | Resin film | | | | | | | | | |
| | Actinic energy ray-curable layer | Resin film or easily | | Front-surface plate | Front-side polarizing plate | | | Rear-side polarizing plate | | |
| | Actinic energy ray-curable composition | Thickness [μm] | adhesive layer-attached resin film | Thickness [μm] | thickness (total thickness) [μm] | Outer protective film | Polarizer | Inner protective film | Outer protective film | Polarizer | Inner protective film |
|---|---|---|---|---|---|---|---|---|---|---|---|
| Example 1 | HC1 | 180 | B-1 | 220 | 400 | C-1 | P-1 | C-4 | C-7 | P-2 | C-9 |
| Example 2 | HC1 | 180 | B-1 | 220 | 400 | C-1 | P-1 | C-4 | C-7 | P-2 | C-9 |
| Example 3 | HC2 | 30 | B-2 | 300 | 330 | C-1 | P-1 | C-4 | C-7 | P-2 | C-9 |
| Example 4 | HC2 | 20 | B-3 | 100 | 120 | C-2 | P-2 | C-5 | C-8 | P-2 | C-10 |
| Example 5 | HC2 | 30 | B-2 | 300 | 330 | C-1 | P-1 | C-4 | C-7 | P-2 | C-9 |
| Example 6 | HC2 | 30 | B-2 | 300 | 330 | C-1 | P-1 | C-4 | C-7 | P-2 | C-9 |
| Example 7 | HC2 | 25 | B-4 | 125 | 150 | C-2 | P-2 | C-5 | C-8 | P-2 | C-10 |
| Example 8 | HC2 | 30 | B-2 | 300 | 330 | C-3 | P-2 | C-6 | C-3 | P-2 | C-6 |
| Example 9 | HC2 | 20 | B-3 | 100 | 120 | C-2 | P-2 | C-5 | C-8 | P-2 | C-10 |
| Example 10 | HC2 | 30 | B-5 | 260 | 290 | C-1 | P-1 | C-4 | C-7 | P-2 | C-9 |
| Comparative Example 1 | HC1 | 180 | B-1 | 220 | 400 | C-1 | P-1 | C-4 | C-7 | P-2 | C-9 |
| Comparative Example 2 | HC2 | 20 | B-3 | 100 | 120 | C-2 | P-2 | C-5 | C-8 | P-2 | C-10 |
| Comparative Example 3 | HC2 | 30 | B-2 | 300 | 330 | C-1 | P-1 | C-4 | C-7 | P-2 | C-9 |
| Comparative Example 4 | HC1 | 180 | B-6 | 240 | 420 | C-1 | P-1 | C-4 | C-7 | P-2 | C-9 |
| Comparative Example 5 | HC3 | 180 | B-1 | 220 | 400 | C-1 | P-1 | C-4 | C-7 | P-2 | C-9 |
| Comparative Example 6 | HC4 | 180 | B-1 | 220 | 400 | C-1 | P-1 | C-4 | C-7 | P-2 | C-9 |
| Comparative Example 7 | HC5 | 20 | B-3 | 100 | 120 | C-2 | P-2 | C-5 | C-8 | P-2 | C-10 |
| Comparative Example 8 | HC2 | 15 | B-7 | 85 | 100 | C-2 | P-2 | C-5 | C-8 | P-2 | C-10 |
| Comparative Example 9 | HC2 | 20 | B-8 | 100 | 120 | C-2 | P-2 | C-5 | C-8 | P-2 | C-10 |

TABLE 3

| | Front-surface plate | | | Adhesive layer | | |
|---|---|---|---|---|---|---|
| | Modulus of elasticity ECp [GPa] | Thickness dCp [μm] | Humidity dimensional change εCp [%] | Composition | Film thickness | Stress relaxation rate |
| Example 1 | 9 | 400 | 0.70 | S-1 | 20 μm | 80% |
| Example 2 | 9 | 400 | 0.70 | S-2 | 20 μm | 20% |
| Example 3 | 4.5 | 330 | 0.50 | S-1 | 20 μm | 80% |
| Example 4 | 3.5 | 120 | 0.15 | S-2 | 20 μm | 80% |
| Example 5 | 4.5 | 330 | 0.50 | S-1 | 2 μm | 80% |
| Example 6 | 4.5 | 330 | 0.50 | S-1 | 100 μm | 80% |
| Example 7 | 3.5 | 150 | 0.15 | S-2 | 20 μm | 20% |
| Example 8 | 4.5 | 330 | 0.50 | S-3 | 20 μm | 59% |
| Example 9 | 3.5 | 120 | 0.15 | S-2 | 20 μm | 20% |
| Example 10 | 4.5 | 290 | 0.50 | S-3 | 20 μm | 59% |
| Comparative Example 1 | 9 | 400 | 0.70 | S-4 | 20 μm | 1.5% |
| Comparative Example 2 | 3.5 | 120 | 0.15 | S-5 | 20 μm | 85% |
| Comparative Example 3 | 4.5 | 330 | 0.50 | S-1 | 1 μm | 80% |
| Comparative Example 4 | 9 | 420 | 0.70 | S-2 | 20 μm | 20% |
| Comparative Example 5 | 10 | 400 | 0.70 | S-2 | 20 μm | 20% |
| Comparative Example 6 | 9 | 400 | 0.80 | S-2 | 20 μm | 20% |
| Comparative Example 7 | 3.0 | 120 | 0.15 | S-1 | 20 μm | 80% |
| Comparative Example 8 | 3.5 | 100 | 0.15 | S-1 | 20 μm | 80% |
| Comparative Example 9 | 3.5 | 120 | 0.10 | S-1 | 20 μm | 80% |

| | Front-side polarizing plate | | | Rear-side polarizing plate | | | |
|---|---|---|---|---|---|---|---|
| | Modulus of elasticity Ef [GPa] | Thickness df [μm] | Humidity dimensional change εf [%] | Modulus of elasticity Er [GPa] | Thickness dr [μm] | Humidity dimensional change εr [%] | A-1 |
| Example 1 | 8.0 | 20 | 0.20 | 8.0 | 12 | 0.35 | 502 |
| Example 2 | 8.0 | 20 | 0.20 | 8.0 | 12 | 0.35 | 2,014 |
| Example 3 | 8.0 | 20 | 0.20 | 8.0 | 12 | 0.35 | 147 |
| Example 4 | 2.0 | 12 | 0.20 | 4.0 | 12 | 0.35 | 1 |
| Example 5 | 8.0 | 20 | 0.20 | 8.0 | 12 | 0.35 | 147 |
| Example 6 | 8.0 | 20 | 0.20 | 8.0 | 12 | 0.35 | 147 |
| Example 7 | 2.0 | 12 | 0.20 | 4.0 | 12 | 0.35 | 51 |
| Example 8 | 6.8 | 53 | 0.30 | 5.5 | 53 | 0.55 | 250 |
| Example 9 | 2.0 | 12 | 0.20 | 4.0 | 12 | 0.35 | 38 |
| Example 10 | 8.0 | 20 | 0.20 | 8.0 | 12 | 0.35 | 266 |
| Comparative Example 1 | 8.0 | 20 | 0.20 | 8.0 | 12 | 0.35 | 2,140 |
| Comparative Example 2 | 2.0 | 12 | 0.20 | 4.0 | 12 | 0.35 | −3 |
| Comparative Example 3 | 8.0 | 20 | 0.20 | 8.0 | 12 | 0.35 | 147 |
| Comparative Example 4 | 8.0 | 20 | 0.20 | 8.0 | 12 | 0.35 | 2,115 |
| Comparative Example 5 | 8.0 | 20 | 0.20 | 8.0 | 12 | 0.35 | 2,238 |
| Comparative Example 6 | 8.0 | 20 | 0.20 | 8.0 | 12 | 0.35 | 2,302 |
| Comparative Example 7 | 2.0 | 12 | 0.20 | 4.0 | 12 | 0.35 | −1 |
| Comparative Example 8 | 2.0 | 12 | 0.20 | 4.0 | 12 | 0.35 | −2 |
| Comparative Example 9 | 2.0 | 12 | 0.20 | 4.0 | 12 | 0.35 | −4 |

TABLE 4

|  | Liquid crystal panel warping [mm] | Annular unevenness (A to C: acceptable) | Circular unevenness (A and B: acceptable) |
|---|---|---|---|
| Example 1 | 2.6 | B | A |
| Example 2 | 5.9 | C | A |
| Example 3 | 1.5 | A | A |
| Example 4 | 0.1 | A | B |
| Example 5 | 5.7 | C | A |
| Example 6 | 1.5 | A | A |
| Example 7 | 0.3 | A | A |
| Example 8 | 2.2 | A | A |
| Example 9 | 0.2 | A | B |
| Example 10 | 2.5 | B | A |
| Comparative Example 1 | 6.2 | D | A |
| Comparative Example 2 | −0.1 | A | C |
| Comparative Example 3 | 6.3 | D | A |
| Comparative Example 4 | 6.1 | D | A |
| Comparative Example 5 | 6.2 | D | A |
| Comparative Example 6 | 6.3 | D | A |
| Comparative Example 7 | −0.1 | A | C |
| Comparative Example 8 | −0.1 | A | C |
| Comparative Example 9 | −0.1 | A | C |

From the results shown in the above tables, it can be confirmed that the liquid crystal display devices of Examples had suppressed occurrence of display unevenness (annular unevenness and circular unevenness) in a high-humidity environment, as compared with the liquid crystal display devices of Comparative Examples.

<Evaluation of Pencil Hardness>

Pencil hardness was evaluated on the outermost surface of the front-surface plate of each of the liquid crystal display devices of Examples and Comparative Examples by the following method according to JIS K 5400.

Each of the liquid crystal display devices of Examples and Comparative Examples was left to stand for 2 hours in an environment of an atmosphere temperature of 25° C. and a relative humidity of 80%. Then, in a case where five sites having different outermost surfaces of the front-surface plate of the liquid crystal panel were scratched under a load of 4.9 N by using a testing pencil with hardness of H to 9H specified in JIS S 6006, the hardness of the pencil (pencil with the highest hardness) by which visually recognized scratch was formed at 0 to 2 sites at this time was defined as pencil hardness. The evaluation results are shown in Table 5.

TABLE 5

|  | Pencil hardness |
|---|---|
| Example 1 | 8H |
| Example 2 | 8H |
| Example 3 | 9H |
| Example 4 | 8H |
| Example 5 | 8H |
| Example 6 | 5H |
| Example 7 | 8H |
| Example 8 | 8H |
| Example 9 | 8H |
| Example 10 | 8H |
| Comparative Example 1 | 8H |
| Comparative Example 2 | 5H |
| Comparative Example 3 | 9H |
| Comparative Example 4 | 8H |
| Comparative Example 5 | 8H |
| Comparative Example 6 | 8H |
| Comparative Example 7 | 5H |
| Comparative Example 8 | 5H |
| Comparative Example 9 | 5H |

The present invention is useful in a field of production of liquid crystal panels and liquid crystal display devices.

What is claimed is:

1. A liquid crystal panel comprising:
a front-surface plate;
a front-side polarizing plate;
a liquid crystal display element; and
a rear-side polarizing plate
in an integrally laminated state,
wherein the front-surface plate includes at least a resin film,
the front-side polarizing plate includes at least a polarizing plate-protecting film;
the front-surface plate and the polarizing plate-protecting film of the front-side polarizing plate are in a state of being laminated via an adhesive layer having a thickness of 2 μm or more,
the absorption axis of the front-side polarizing plate is perpendicular to the absorption axis of the rear-side polarizing plate, and
the liquid crystal panel satisfies Formula A-1, $$2020 \ \mu mGPa > ECp \times dCp \times \varepsilon Cp \times (100-P)/100 + (Ef \times df \times \varepsilon f) - (Er \times dr \times \varepsilon r) > 0 \ \mu mGPa \quad \text{Formula A-1:}$$

in the formula, ECp is the modulus of elasticity of the front-surface plate in a unit of GPa, dCp is the thickness of the front-surface plate in a unit of μm, εCp is the humidity dimensional change rate of the front-surface plate in a unit of %, Ef is the modulus of elasticity of the front-side polarizing plate in a unit of GPa, df is the thickness of the front-side polarizing plate in a unit of μm, εf is the humidity dimensional change rate of the front-side polarizing plate in a unit of %, Er is the modulus of elasticity of the rear-side polarizing plate in a unit of GPa, dr is the thickness of the rear-side polarizing plate in a unit of μm, εr is the humidity dimensional change rate of the rear-side polarizing plate in a unit of %, and P is the stress relaxation rate of the adhesive layer in a unit of %.

2. The liquid crystal panel according to claim 1,
wherein the front-surface plate has a modulus of elasticity ECp in a range of 3.5 to 9.0 GPa, a humidity dimensional change rate εCp in a range of 0.15% to 0.70%, and a thickness dCp in a range of 120 to 400 μm.

3. The liquid crystal panel according to claim 1,
wherein the adhesive layer has a stress relaxation rate P in a range of 20% to 80%.

4. The liquid crystal panel according to claim 1,
wherein the front-surface plate has a cured layer formed by curing an actinic energy ray-curable composition on a surface of the resin film on the side opposite to the front-side polarizing plate side.

5. The liquid crystal panel according to claim 1,
wherein the front-side polarizing plate and the rear-side polarizing plate each have two polarizing plate-protecting films, and a polarizer layer positioned between the two polarizing plate-protecting films.

6. The liquid crystal panel according to claim 5,
wherein at least one of the polarizing plate-protecting films includes a cellulose acylate film.

7. The liquid crystal panel according to claim 5,
wherein the polarizing plate-protecting film positioned on at least the liquid crystal display element side of the front-side polarizing plate, and the polarizing plate-protecting film positioned on at least the liquid crystal display element side of the rear-side polarizing plate each include a cellulose acylate film.

8. The liquid crystal panel according to claim 5,
wherein the polarizer layer included in the front-side polarizing plate and the polarizer layer included in the rear-side polarizing plate are each an iodine-dyed polyvinyl alcohol-based film.

9. The liquid crystal panel according to claim 1,
wherein the adhesive layer is a layer including an acrylic pressure-sensitive adhesive.

10. The liquid crystal panel according to claim 1, further comprising:
an antistatic agent in at least any one portion.

11. The liquid crystal panel according to claim 1,
wherein the liquid crystal display element is an in-cell touch panel liquid crystal display element.

12. The liquid crystal panel according to claim 1,
wherein the liquid crystal display element is an on-cell touch panel liquid crystal display element.

13. A liquid crystal display device comprising:
the liquid crystal panel according to claim 1; and
a backlight unit.

* * * * *